United States Patent
Shepherd et al.

(10) Patent No.: US 11,164,420 B2
(45) Date of Patent: Nov. 2, 2021

(54) SYSTEM AND METHOD FOR SETTLING FUNDS TRANSFERS BETWEEN DIFFERENT GAMING ESTABLISHMENT ACCOUNTS MAINTAINED BY DIFFERENT GAMING ESTABLISHMENTS

(71) Applicant: IGT, Las Vegas, NV (US)

(72) Inventors: Jeffery Shepherd, Reno, NV (US); Kevin Higgins, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 16/591,195

(22) Filed: Oct. 2, 2019

(65) Prior Publication Data

US 2021/0104122 A1 Apr. 8, 2021

(51) Int. Cl.
| | |
|---|---|
| G06F 17/00 | (2019.01) |
| G07F 17/32 | (2006.01) |
| G06Q 20/10 | (2012.01) |
| G06Q 20/06 | (2012.01) |
| G06Q 40/02 | (2012.01) |

(52) U.S. Cl.
CPC ..... *G07F 17/3251* (2013.01); *G06Q 20/0655* (2013.01); *G06Q 20/108* (2013.01); *G06Q 40/02* (2013.01); *G07F 17/3227* (2013.01)

(58) Field of Classification Search
None
See application file for complete search history.

(56) References Cited

U.S. PATENT DOCUMENTS

| | | | |
|---|---|---|---|
| 6,394,907 B1 | 5/2002 | Rowe | |
| 6,866,586 B2 | 3/2005 | Oberberger et al. | |
| 6,969,319 B2 | 11/2005 | Rowe et al. | |
| 7,419,428 B2 | 9/2008 | Rowe | |
| 7,536,349 B1 * | 5/2009 | Mik | G06Q 20/14 705/39 |
| 7,950,996 B2 | 5/2011 | Nguyen et al. | |
| 8,364,566 B2 | 1/2013 | Olliphant | |
| 8,484,127 B2 | 7/2013 | Olliphant | |
| 8,734,236 B2 | 5/2014 | Arezina et al. | |
| 8,968,075 B2 * | 3/2015 | Warner | G07F 17/3244 463/20 |
| 9,192,852 B2 * | 11/2015 | Gagner | G07F 17/32 |
| 10,360,761 B2 | 7/2019 | Higgins et al. | |
| 10,417,866 B2 * | 9/2019 | Nonaka | G07F 17/32 |
| 10,631,164 B2 * | 4/2020 | Yang | H04W 12/06 |
| 2006/0064378 A1 | 3/2006 | Clementz et al. | |
| 2007/0244831 A1 * | 10/2007 | Kuo | G06Q 20/3829 705/67 |
| 2008/0113776 A1 * | 5/2008 | Sommer | G07F 17/3248 463/25 |
| 2010/0227670 A1 * | 9/2010 | Arezina | G07F 17/3244 463/25 |
| 2011/0077073 A1 * | 3/2011 | Gagner | G07F 17/32 463/25 |
| 2011/0086691 A1 | 4/2011 | Luciano, Jr. et al. | |

(Continued)

*Primary Examiner* — Paul A D'Agostino
(74) *Attorney, Agent, or Firm* — Neal, Gerber & Eisenberg LLP

(57) ABSTRACT

A system and method that facilitates the transferring of funds between different financial institution accounts based on the transferring of funds between different gaming establishment accounts associated with different gaming establishments.

20 Claims, 10 Drawing Sheets

(56) References Cited

U.S. PATENT DOCUMENTS

| | | | |
|---|---|---|---|
| 2011/0246365 A1* | 10/2011 | Hogg | G06Q 30/02 705/44 |
| 2011/0263318 A1* | 10/2011 | Agarwal | G07F 17/32 463/25 |
| 2012/0122584 A1 | 5/2012 | Nguyen | |
| 2012/0271707 A1 | 10/2012 | Harrison et al. | |
| 2012/0310778 A1 | 12/2012 | Paulsen et al. | |
| 2012/0315984 A1* | 12/2012 | Carrico | G07F 17/3255 463/30 |
| 2013/0073447 A1* | 3/2013 | Smith | G06Q 40/02 705/39 |
| 2013/0130781 A1* | 5/2013 | Anderson | G07F 17/3244 463/25 |
| 2013/0317987 A1 | 11/2013 | Tsutsui | |
| 2014/0057703 A1* | 2/2014 | LeStrange | G07F 17/3248 463/25 |
| 2014/0080578 A1* | 3/2014 | Nguyen | G07F 17/3204 463/25 |
| 2014/0094284 A1* | 4/2014 | Sanford | G06Q 30/0226 463/25 |
| 2014/0235325 A1* | 8/2014 | Merati | G07F 17/3244 463/25 |
| 2014/0323206 A1 | 10/2014 | Gagner et al. | |
| 2015/0012305 A1* | 1/2015 | Truskovsky | G06Q 10/02 705/5 |
| 2015/0087408 A1* | 3/2015 | Siemasko | G06Q 30/06 463/25 |
| 2015/0141125 A1* | 5/2015 | LeStrange | G07F 17/3225 463/25 |
| 2015/0199868 A1* | 7/2015 | Kelly | G07F 17/3223 463/25 |
| 2015/0235521 A1* | 8/2015 | Lutnick | G07F 17/3239 463/25 |
| 2015/0278819 A1* | 10/2015 | Song | G06Q 20/042 705/45 |
| 2016/0292965 A1* | 10/2016 | Sanford | G07F 17/3244 |
| 2017/0061438 A1* | 3/2017 | Patel | G06Q 20/042 |
| 2017/0091727 A1* | 3/2017 | Richards | G06Q 20/341 |
| 2017/0092054 A1* | 3/2017 | Petersen | G07F 17/3211 |
| 2018/0232720 A1* | 8/2018 | Robeen | G06Q 20/227 |
| 2019/0188956 A1* | 6/2019 | Higgins | G06Q 20/322 |

* cited by examiner

SYSTEM AND METHOD FOR SETTLING FUNDS TRANSFERS BETWEEN DIFFERENT GAMING ESTABLISHMENT ACCOUNTS MAINTAINED BY DIFFERENT GAMING ESTABLISHMENTS

TECHNICAL FIELD

The technical field of the present disclosure is that of systems and methods that transfer funds between different financial institution accounts based on the transferring of funds between different gaming establishment accounts associated with different gaming establishments.

BACKGROUND

Gaming machines may provide players awards in primary games. Gaming machines generally require the player to place a wager to activate the primary game. The award may be based on the player obtaining a winning symbol or symbol combination and on the amount of the wager.

BRIEF SUMMARY

In certain embodiments, the present disclosure relates to a system including a processor, and a memory device that stores a plurality of instructions. When executed by the processor, the instructions cause the processor to maintain a first gaming establishment account in association with a user. When executed by the processor responsive to a gaming establishment account transfer event occurring in association with the first gaming establishment account, the instructions cause the processor to communicate data associated with a request of an amount of funds to be transferred from a second gaming establishment account maintained in association with the user to the first gaming establishment account, wherein the first gaming establishment account is associated with a first financial institution account associated with a first gaming establishment and the second gaming establishment account is associated with a second, different financial institution account associated with a second gaming establishment. When executed by the processor responsive to an approval of the request of the amount of funds to be transferred from the second gaming establishment account, the instructions cause the processor to modify a balance of the first gaming establishment account based on the amount of funds, wherein the modification of the balance of the first gaming establishment account results in each of a modification of a balance of the second gaming establishment account based on the amount of funds transferred to the first gaming establishment account, a modification of a balance of the first financial institution account based on the amount of funds transferred from the second gaming establishment account, and a modification of a balance of the second financial institution account based on the amount of funds transferred to the first gaming establishment account.

In certain embodiments, the present disclosure relates to a system including a processor, and a memory device that stores a plurality of instructions. When executed by the processor responsive to a determination to transfer an amount of funds from a first gaming establishment account maintained in association with a user to a second gaming establishment account maintained in association with the user, the instructions cause the processor to communicate first data to a server of a first gaming establishment fund management system, and communicate second data to a server of a second gaming establishment fund management system, wherein the communicated first data results in a deduction of the amount of funds from the first gaming establishment account, and the communicated second data results in an increase of the amount of funds in the first gaming establishment account. When executed by the processor responsive to the determination to transfer the amount of funds from the first gaming establishment account maintained in association with the user to the second gaming establishment account maintained in association with the user, the instructions cause the processor to communicate third data to a server of a first financial institution account associated with a first gaming establishment, and communicate fourth data to a server of a second, different financial institution account associated with a second gaming establishment, wherein the communicated third data results in a deduction of the amount of funds from the first financial institution account and the communicated fourth data results in an increase of the amount of funds in the second, different financial institution account.

In certain embodiments, the present disclosure relates to a method of operating a system including maintaining, by a processor, a first gaming establishment account in association with a user. Responsive to a gaming establishment account transfer event occurring in association with the first gaming establishment account, the method includes communicating data associated with a request of an amount of funds to be transferred from a second gaming establishment account maintained in association with the user to the first gaming establishment account, wherein the first gaming establishment account is associated with a first financial institution account associated with a first gaming establishment and the second gaming establishment account is associated with a second, different financial institution account associated with a second gaming establishment. Responsive to an approval of the request of the amount of funds to be transferred from the second gaming establishment account, the method includes modifying, by the processor, a balance of the first gaming establishment account based on the amount of funds, wherein the modification of the balance of the first gaming establishment account results in each of a modification of a balance of the second gaming establishment account based on the amount of funds transferred to the first gaming establishment account, a modification of a balance of the first financial institution account based on the amount of funds transferred from the second gaming establishment account, and a modification of a balance of the second financial institution account based on the amount of funds transferred to the first gaming establishment account.

Additional features are described herein, and will be apparent from the following Detailed Description and the figures.

DETAILED DESCRIPTION

Figure 1A:
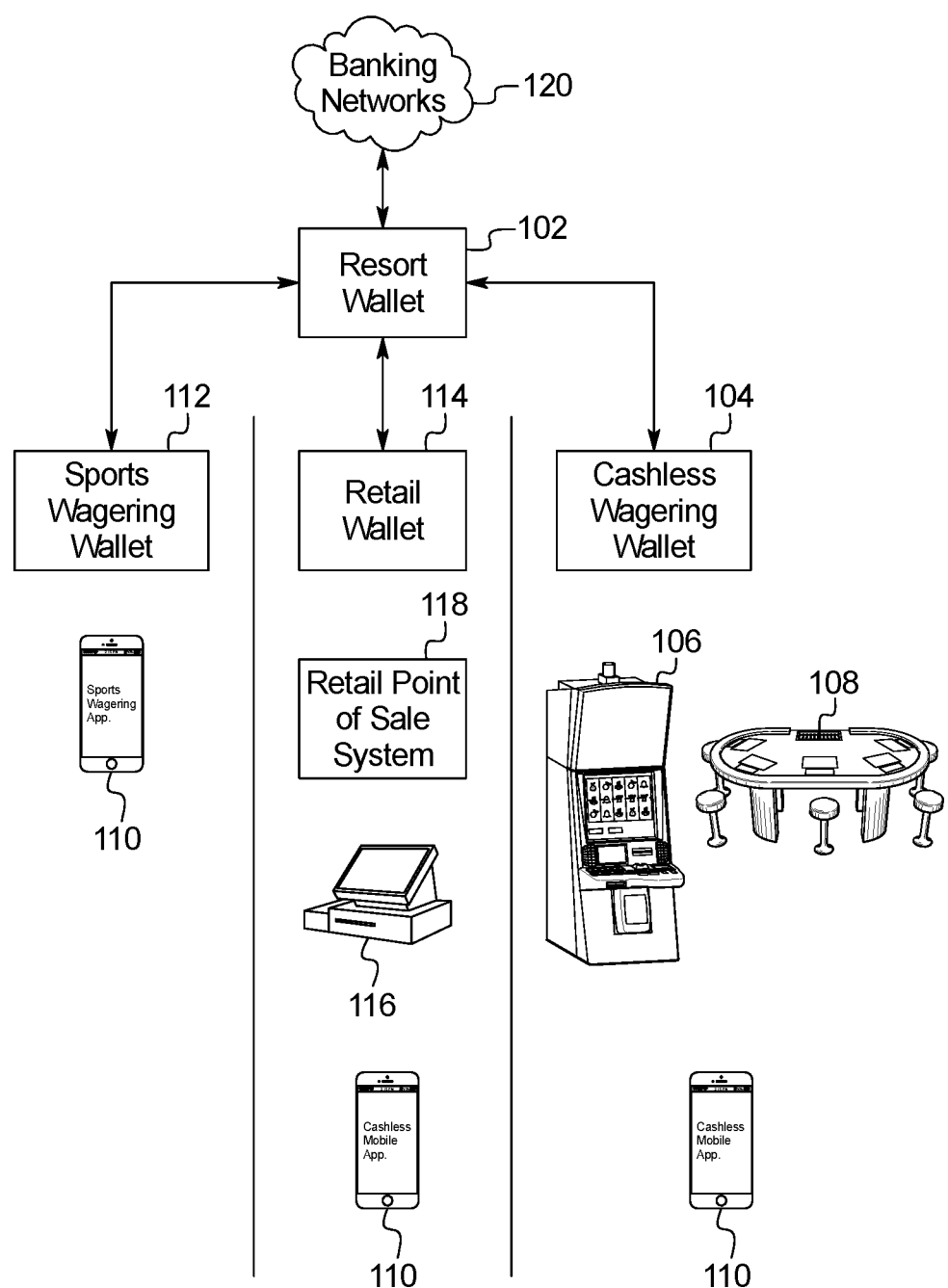
FIG. 1A is an example schematic configuration of the architecture of a plurality of different components of a gaming establishment fund management system disclosed herein.

In various embodiments, the system and method disclosed herein facilitates the transferring of funds between different financial institution accounts based on the transferring of funds between different gaming establishment accounts associated with different gaming establishments.

In certain embodiments, upon an occurrence of an event which causes the transfer of an amount of funds from one gaming establishment account associated with a first gaming establishment to another gaming establishment account associated with a second gaming establishment, the system causes a corresponding amount of funds to be transferred from one financial institution account associated with the first gaming establishment to another financial institution account associated with the second gaming establishment. In these embodiments, since certain gaming jurisdictions require that the amount of funds associated with one or more gaming establishment accounts maintained by a gaming establishment for one or more users are secured by a corresponding amount of funds in one or more financial institution accounts for the gaming establishment, a transfer of funds to and/or from such gaming establishment accounts may result in the one or more financial institution accounts not having the corresponding correct amount of funds. Accordingly, in certain embodiments, to reconcile such fund transfers between different gaming establishment accounts associated with different gaming establishments (which are secured by different financial institution accounts), the system disclosed herein automatically causes, either in association with each transfer of funds between gaming establishment accounts or in association with a plurality of transfers of funds between gaming establishment accounts, the transfer of funds between the different financial institution accounts associated with these different gaming establishments. These automatic transfers ensure that the respective amounts maintained in the different gaming establishment accounts maintained by the gaming establishment comply with jurisdictional requirements by corresponding with the amounts maintained in the one or more associated financial institution accounts. Such a configuration of periodically transferring funds from one financial institution account to another financial instructions account (which is based on the transfer of funds from one gaming establishment account to another gaming establishment account) enables the system to reconcile such fund transfers in accordance with various regulatory requirements.

System Accounts

In various embodiments, the system disclosed herein includes a gaming establishment fund management system including various components or sub-systems that are each associated with or otherwise maintain one or more electronic or virtual accounts. In these embodiments, the various gaming establishment accounts maintained for a user collectively form a resort or enterprise account (e.g., a gaming establishment fund management account) for the user. That is, the collection of cashless wagering accounts (e.g. cashless gaming establishment wagering wallets, cashless sports wagering wallets and/or cashless mobile wagering wallets) and gaming establishment retail accounts (e.g., gaming establishment retail wallets) associated with or otherwise maintained for a user, such as a player and/or retail patron, collectively form a resort or enterprise account (i.e., an integrated resort or gaming establishment fund management wallet) that the user may access to transfer funds and/or view balance information amongst the various accounts associated with or otherwise maintained for the user.

In certain embodiments, the system disclosed herein includes a single gaming establishment fund management system which is associated with a plurality of gaming establishments and maintains one or more gaming establishment accounts associated with a user for each associated gaming establishment. In these embodiments, the different gaming establishment accounts associated with the user at the different gaming establishments are linked or otherwise associated with each other to enable an amount of funds maintained in association with a gaming establishment account of one gaming establishment associated with the gaming establishment fund management system to be transferred to another gaming establishment account of another gaming establishment associated with the gaming establishment fund management system.

In certain embodiments, the system disclosed herein includes a plurality of gaming establishment fund management systems that are each associated with or otherwise maintain one or more gaming establishment fund management accounts for a user. In these embodiments, two or more of such gaming establishment fund management systems are linked or otherwise associated with each other to enable an amount of funds maintained in association with a gaming establishment account of one gaming establishment fund management system to be transferred to another gaming establishment account of a linked gaming establishment fund management system.

It should be appreciated that while one or more gaming establishments are each associated with the same or different gaming establishment fund management system, in different embodiments, such gaming establishments may be associated with a single property or multiple properties. In these embodiments, a gaming establishment associated with a gaming establishment fund management system includes one or more gaming establishment sites having one or more EGMs and/or associated with one or more personal gaming devices that are within one or more designated jurisdictions, states or territories. In these embodiments, a gaming establishment site includes a single property where an EGM may operate and which may be associated with a group of one or more other gaming establishment sites under a single gaming establishment brand within one or more designated jurisdictions, states or territories.

In various embodiments, one or more of the gaming establishment fund management systems each includes one or more cashless wagering systems that are each associated with or otherwise maintain one or more cashless wagering accounts. In certain embodiments, the gaming establishment fund management system includes a first cashless wagering system that maintains a first cashless wagering account. In these embodiments, a user, such as a player of a gaming establishment wagering device, utilizes a mobile device application running on a mobile device and/or a physical instrument (e.g., a smart card or a player issued magnetic striped card which the player utilizes via inserting the card into a player tracking unit associated with a gaming establishment wagering device) to facilitate the electronic transfer of any funds between this first cashless wagering account and a gaming establishment wagering device that offers wagering games, such as an electronic gaming machine ("EGM") including, but not limited to, a slot machine, a video poker machine, a video lottery terminal, a terminal associated with an electronic table game, a terminal associated with a live table game, a video keno machine, a video bingo machine located on a casino floor and/or a sports betting terminal (that offers wagering games and sports betting opportunities). For example, as seen in FIG. 1A, the gaming establishment fund management system includes a first cashless wagering system (not shown) that maintains a Cashless Wagering Wallet 104 (e.g., a first cashless wagering account) which is in communication with the resort wallet 102. In this example, to facilitate the transfer of funds from this cashless wagering account to a credit balance of an EGM 106 and/or a gaming table 108, the system utilizes a mobile device 110 running a mobile device application that interfaces with one or more components of the gaming establishment fund management system to enable a user, such as a player of the EGM or a player at the gaming table, access to this first cashless wagering account.

In certain embodiments, one or more of the gaming establishment fund management systems each additionally or alternatively includes a second cashless wagering system that maintains a second cashless wagering account. In these embodiments, funds associated with the second cashless wagering account are utilized to place one or more sporting event wagers and/or wagers placed remote from an EGM and a gaming table. In such embodiments, a user utilizes a mobile device application running on a mobile device and/or a physical instrument (e.g., a smart card or a player issued magnetic striped card which the player utilizes via inserting the card into a kiosk) to facilitate the electronic transfer of any funds between this second cashless wagering account and a credit balance accessible to wager on games of chance, games of skill and/or sporting events remote from an EGM and a gaming table. For example, as seen in FIG. 1A, the gaming establishment fund management system includes a second cashless wagering system (not shown) that maintains a Sports/Mobile Wagering Wallet 112 (e.g., a second cashless wagering account) which is in communication with the resort wallet 102. In this example, to facilitate the transfer of funds from this cashless wagering account to a credit balance associated with a sporting event wagering system (not shown) and/or a remote wagering system (not shown) to enable the placement of one or more wagers on one or more games of chance, one or more games of skill and/or one or more sporting events, the system utilizes a mobile device 110 running a mobile device application that interfaces with one or more components of the gaming establishment fund management system to enable a user, such as a player remote from the gaming establishment, access to this second cashless wagering account.

In various embodiments, in addition to or an alternative of maintaining one or more cashless wagering accounts via one or more cashless wagering systems, one or more of the gaming establishment fund management systems each includes one or more gaming establishment retail wallet systems that each maintain one or more gaming establishment retail accounts. Such a gaming establishment retail account (e.g., a gaming establishment retail wallet) of a gaming establishment retail wallet system integrates with various retail point-of-sale systems throughout the gaming establishment (or located remote from the gaming establishment, but otherwise associated with the gaming establishment) to enable users to purchase goods and/or services via the user's gaming establishment retail account. For example, as seen in FIG. 1A, the gaming establishment fund management system includes a gaming establishment retail wallet system (not shown) that maintains a Retail Wallet 114 (e.g., a gaming establishment retail account) which is in communication with the resort wallet 102. In this example, to facilitate the transfer of funds from this gaming establishment retail account to an account associated with a retailer to purchase goods and/or services from the retailer, the system utilizes retail wallet identity, such as a mobile device 110 running a mobile device application that interfaces with a point-of-sale terminal 116 of a retail point-of-sale system 118 of the retailer, and one or more components of the gaming establishment fund management system to enable a user access to this gaming establishment retail account.

It should be appreciated that in various embodiments, a gaming establishment retail account is a retail account associated with a user having a balance or a pre-paid access account which, per current regulations from the U.S. Treasury Department Financial Crimes Enforcement Network ("FinCEN"), cannot be convertible to cash and can only be used for the purchase of goods and/or services. In these embodiments, such a gaming establishment retail account integrates with various retail point-of-sale systems of various retail establishments throughout or otherwise associated with a gaming establishment to enable users to purchase goods and/or services via the user's gaming establishment retail account. That is, while an amount of funds deposited in a gaming establishment retail account may be used with various retail point-of-sale systems throughout the gaming establishment (or remote from, but otherwise associated with the gaming establishment) to enable users to purchase goods and/or services, such funds deposited in the gaming establishment retail account cannot be converted to cash.

In certain embodiments, one or more of the gaming establishment fund management systems are each in communication with one or more external funding sources which maintain one or more external accounts for the user. For example, as seen in FIG. 1A, the gaming establishment fund management system that maintains the resort wallet 102 is in communication with a network of one or more banks or other financial institutions (i.e., the banking networks 120) which operate to electronically transfer funds from the user's accounts maintained as such banks or financial institutions to one or more of the accounts maintained by the gaming establishment fund management system. In certain embodiments, such external accounts include, but are not limited to, one or more checking accounts maintained by one or more financial institutions (e.g., one or more banks and/or credit unions), one or more savings accounts maintained by one or more financial institutions, one or more financial institution accounts, such as a brokerage account, maintained by one or more financial institutions, one or more credit card accounts maintained by one or more financial institutions, one or more debit card accounts maintained by one or more financial institutions, and/or one or more third-party maintained accounts (e.g., one or more PayPal® accounts or Venmo® accounts). It should be appreciated that while illustrated as the gaming establishment fund management system being in communication with one or more external funding sources, in different embodiments, any component or sub-system described herein can be in communication with one or more external funding sources. In different embodiments, the system utilizes a mobile device running a mobile device application, a kiosk, an EGM, a remote host controller service window displayed by an EGM, a component of a gaming establishment patron management system, such as a player tracking unit, and/or a gaming establishment interface to facilitate the transfer of funds from a third-party account.

In certain embodiments (not shown), one or more of the gaming establishment fund management systems (which maintains a gaming establishment fund management account or resort wallet for a user) are each in communication with one or more credit systems that each issue the user one or more lines of credit or markers and/or one or more credit reporting/credit risk systems that monitor and report on various accounts associated with the user. It should be appreciated that while described as the gaming establishment fund management system being in communication with one or more credit systems and/or one or more credit reporting/credit risk systems, in different embodiments, any component or sub-system described herein can be in communication with one or more credit systems and/or one or more credit reporting/credit risk systems.

In certain embodiments, the system utilizes one mobile device application to interact with the different components of the gaming establishment fund management system to access funds maintained in the different gaming establishment accounts associated with the user. For example, utilizing the same mobile application, a mobile device interacts with both the first cashless wagering system of the gaming establishment fund management system and the gaming establishment retail wallet system of the gaming establishment fund management system. In certain embodiments, the system utilizes multiple mobile device applications to interact with the different components of the gaming establishment fund management system to access funds maintained in the different gaming establishment accounts associated with the user. For example, in addition to utilizing a mobile application to interact with different systems of the gaming establishment fund management system, utilizing a sports/mobile wagering mobile application, a mobile device interacts with the second cashless wagering system of the gaming establishment fund management system. In certain of these embodiments, the mobile device application includes a location based digital wallet enabled application, such as a Passbook-enabled or Wallet-enabled application, which is accessible when the player enters a gaming establishment. In certain of such embodiments, the mobile device application is downloaded to the mobile device from an application store. In certain of such embodiments, the mobile device application is downloaded to the mobile device from one or more websites affiliated with the gaming establishment (which are accessible directly by the user and/or by a link opened when the user scans a QR code).

It should be appreciated that while illustrated in FIG. 1A as using a mobile device running a mobile device application to access funds associated with different gaming establishment accounts, such as a cashless wagering account and a gaming establishment retail account, a physical instrument, such as a smart card or a user issued magnetic striped card may additionally or alternatively be utilized to enable a user access to such gaming establishment accounts. It should be further appreciated that in different embodiments, in addition to or alternatively from utilizing a mobile device running a mobile device application to access funds associated with different gaming establishment accounts, the system utilizes a kiosk, an EGM, a remote host controller service window displayed by an EGM, a component of a gaming establishment patron management system, such as a player tracking unit, and/or a gaming establishment interface to access the funds associated with such gaming establishment accounts.

In certain embodiments, the creation of one or more gaming establishment accounts occurs via the system enabling a user or player to enroll in such gaming establishment accounts. In one such embodiment, the system enables a user or player to enroll or otherwise sign up for a gaming establishment account via the user picking up an account card, such as a retail account card at various shopping locations throughout the gaming establishment. In another such embodiment, the system enables a user or player to electronically enroll or otherwise sign up for a gaming establishment account via a mobile application running on a mobile device, a point-of-sale terminal, an EGM and/or a kiosk. In another such embodiment, the system enables a user or player to enroll or otherwise sign up for a gaming establishment account by adding another account, such as a gaming establishment retail account, to their existing player tracking account.

In certain embodiments, the creation of a gaming establishment account occurs enterprise wide upon a user (whom is not associated with a gaming establishment account) attempting to use an amount of funds associated with the user (i.e., funds associated with the user's resort wallet or enterprise wallet) at a first site. In these embodiments, upon the requested use of the funds of the user's resort wallet from a component of the system not otherwise linked to or associated with the user's resort wallet, the system will create an enterprise wide gaming establishment account associated with the requesting component of the system and one or more other components of the system (such as one or more other individual sites of future attempted purchases). In certain embodiments, the creation of a gaming establishment account occurs via the user attempting to use an amount of funds associated with the user (i.e., funds associated with the user's resort wallet or enterprise wallet) at an individual site which was not previously associated with the user's resort wallet or enterprise wallet. In these embodiments, upon the requested use of the funds of the user's resort wallet from a component of the system not otherwise linked to or associated with the user's resort wallet, the system will create a gaming establishment account associated with the requesting component of the system. For example, if a user attempts to use funds from their resort wallet at a gaming establishment retail location not previously linked to the user's resort wallet, prior to the system employing such funds to purchase one or more pre-paid cards to complete the retail transaction, the system will create a gaming establishment retail account for the gaming establishment retail location and associate the created gaming establishment retail account with the user's existing resort wallet. Such dynamic account creation provides users enhanced ease of use as they can seamlessly use their existing resort wallet at various new sites or locations within or otherwise associated with one or more gaming establishments.

Funding Gaming Establishment Account

In various embodiments, prior to utilizing any funds maintained in a gaming establishment account as described herein, an amount of funds must first be established or otherwise deposited in a gaming establishment account, such as a gaming establishment fund management account, a cashless wagering account and/or a gaming establishment retail account. In other words, prior to the system enabling the use of such funds, an amount of funds must first be deposited in or otherwise transferred to an account.

In certain embodiments, a gaming establishment account maintained for a user in association with a first gaming establishment is associated with another gaming establishment account maintained for the user in association with a second gaming establishment. In these embodiments, the system enables an amount of funds from one gaming establishment account maintained for a user in association with a first gaming establishment to be transferred to another gaming establishment account maintained for the user in association with a second gaming establishment. That is, the system disclosed herein enables the transfer of funds between different gaming establishment accounts (that are maintained by the same or different gaming establishment fund management systems) associated with different gaming establishments or different sites of the same gaming establishment. For example, upon a player attempting to transfer an amount of funds from a cashless wagering account maintained by a cashless wagering system of a first gaming establishment to an EGM at that first gaming establishment and the gaming establishment fund management system of that gaming establishment determining that neither the cashless wagering account nor any other accounts maintained by the gaming establishment fund management system for that player in association with that first gaming establishment have the requested amount of funds to transfer to the EGM, the system disclosed herein enables the gaming establishment fund management system of that first gaming establishment to attempt to obtain the requested amount of funds from another cashless wagering account maintained by another cashless wagering system of another gaming establishment.

In certain embodiments, following a determination to transfer an amount of funds to a first gaming establishment account or balance maintained by a first gaming establishment fund management system in association with a first gaming establishment from a second gaming establishment account or balance maintained by a second gaming establishment fund management system (which may be the same or different from the first gaming establishment fund management system) in association with a second gaming establishment, the system determines whether to authorize the transfer of the determined amount of funds. In other words, upon the first gaming establishment fund management system of the first gaming establishment determining that the first gaming establishment account lacks adequate funds to complete one or more requested actions (as described below), the first gaming establishment fund management system requests a transfer of funds from a second gaming establishment account maintained by a second gaming establishment fund management system of a second gaming establishment.

If the system determines not to authorize the transfer of the amount of funds, the system communicates a denial of fund transfer to one or more components of one or more of the gaming establishment fund management systems. Put differently, upon the second gaming establishment fund management system of the second gaming establishment determining not transfer funds to the first gaming establishment account maintained by the first gaming establishment fund management system of the first gaming establishment, such as the second gaming establishment fund management system determining that the second gaming establishment account lacks the requested amount of funds, the second gaming establishment fund management system notifies the first gaming establishment fund management system that the determined amount of funds will not be transferred.

On the other hand, if the system determines to authorize the transfer of the amount of funds, the second gaming establishment fund management system updates the second gaming establishment account (to reflect a reduction of the amount of funds) and communicates an authorization to the first gaming establishment fund management system. The first gaming establishment fund management system then increases a balance of available funds of the first gaming establishment account or balance by the transferred amount of funds. In other words, upon the second gaming establishment fund management system of the second gaming establishment determining to authorize the transfer funds to the first gaming establishment account maintained by the first gaming establishment fund management system of the first gaming establishment, such as the second gaming establishment fund management system determining that the second gaming establishment account is associated with the requested amount of funds, the second gaming establishment fund management system notifies the first gaming establishment fund management system of the transfer such that both gaming establishment fund management systems may update the amount of funds in each respective gaming establishment account.

In various embodiments, in addition to updating the amount of funds in each respective gaming establishment account to reflect the authorized transfer of funds between the different gaming establishment accounts, the system disclosed herein causes a corresponding amount of funds to be transferred between different financial institution accounts associated with the different gaming establishment accounts. That is, since certain accounting practices and/or jurisdictional regulations require that the amount of funds associated with one or more gaming establishment accounts maintained by a gaming establishment for one or more users are secured by a corresponding amount of funds in one or more financial institution accounts of the gaming establishment, and since a transfer of funds to and/or from such gaming establishment accounts may result in the one or more financial institution accounts of the gaming establishment not having the corresponding correct amount of funds, the system disclosed herein causes, either in association with each transfer of funds between gaming establishment accounts or in association with a plurality of transfers of funds between gaming establishment accounts, a transfer of a corresponding amount of funds between the different financial institution accounts associated with the gaming establishments. In other words, to reconcile fund transfers between different gaming establishment accounts associated with different gaming establishments (which are secured by different financial institution accounts), the system triggers corresponding fund transfers between these different financial institution accounts such that both gaming establishments comply with accounting practices and/or jurisdictional requirements following the transfer of funds between these different gaming establishment. As such, the system disclosed herein provides that a completion of a transfer of funds between gaming establishment accounts maintained by one or more gaming establishment fund management systems is associated with a corresponding completion of the transfer of funds between financial institutional accounts that secure such gaming establishment accounts to ensure that each financial institution account updates a balance of available funds to reflect either a reduction of an amount of funds corresponding to an amount of funds transferred away from the gaming establishment account associated with that financial institution account or an increase of an amount of funds corresponding to an amount of funds transferred to the gaming establishment account associated with that financial institution account.

Figure 1B:
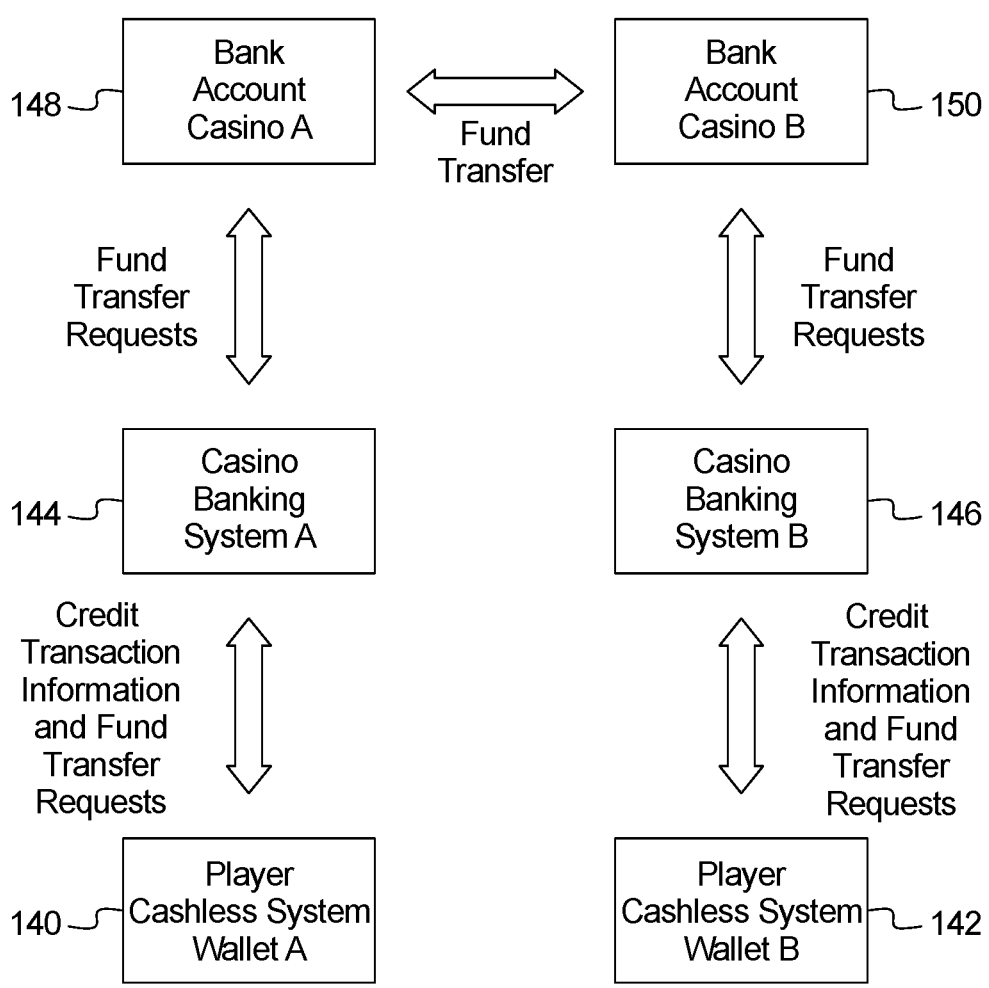
FIG. 1B is an example schematic configuration of the architecture of one embodiment of a plurality of different components utilized to transfer funds between different gaming establishment accounts associated with different financial institution accounts.

In certain embodiments, to reconcile fund transfers amongst financial institution accounts, one or more servers of each gaming establishment fund management system communicates data regarding the transfer of funds between gaming establishment accounts to one or more servers of the financial institution associated with that gaming establishment fund management system. In these embodiments, the one or more servers of the financial institutions then communicate data with each other to complete the transfer of funds between the financial institution accounts which secure the gaming establishment accounts of the different gaming establishments that transferred the funds between each other. For example, as seen in FIG. 1B, in association with the transfer of an amount of funds between a cashless wagering account associated with a first gaming establishment (e.g., Player Cashless System Wallet A 140) and a cashless wagering account associated with a second gaming establishment (e.g., Player Cashless System Wallet B 142), the gaming establishment fund management system of the first gaming establishment communicates data regarding this transfer of an amount of funds and any applicable fund transfer requests to one or more servers of a first financial institution associated with the first gaming establishment (e.g., Casino Banking System A 144). As also seen in FIG. 1B, following the transfer of the amount of funds between the cashless wagering accounts of the different gaming establishment, the gaming establishment fund management system of the second gaming establishment also communicates data regarding this transfer of an amount of funds and any applicable fund transfer requests to one or more servers of a second financial institution associated with the second gaming establishment (e.g., Casino Banking System B 146). In this example, upon receiving data from a respective gaming establishment fund management system, one or more servers of the first financial institution and/or one or more server of the second financial institution communicate data which result in a transfer of an amount of funds (at least corresponding to the amount of funds transferred between the cashless wagering account associated with the first gaming establishment and the cashless wagering account associated with the second gaming establishment) between a first financial institution account (e.g., Bank Account Casino A 148) which secures the first cashless wagering account of the first gaming establishment and a second financial institution (e.g., Bank Account Casino B 150) which secures the second cashless wagering account of the second gaming establishment.

Figure 1C:
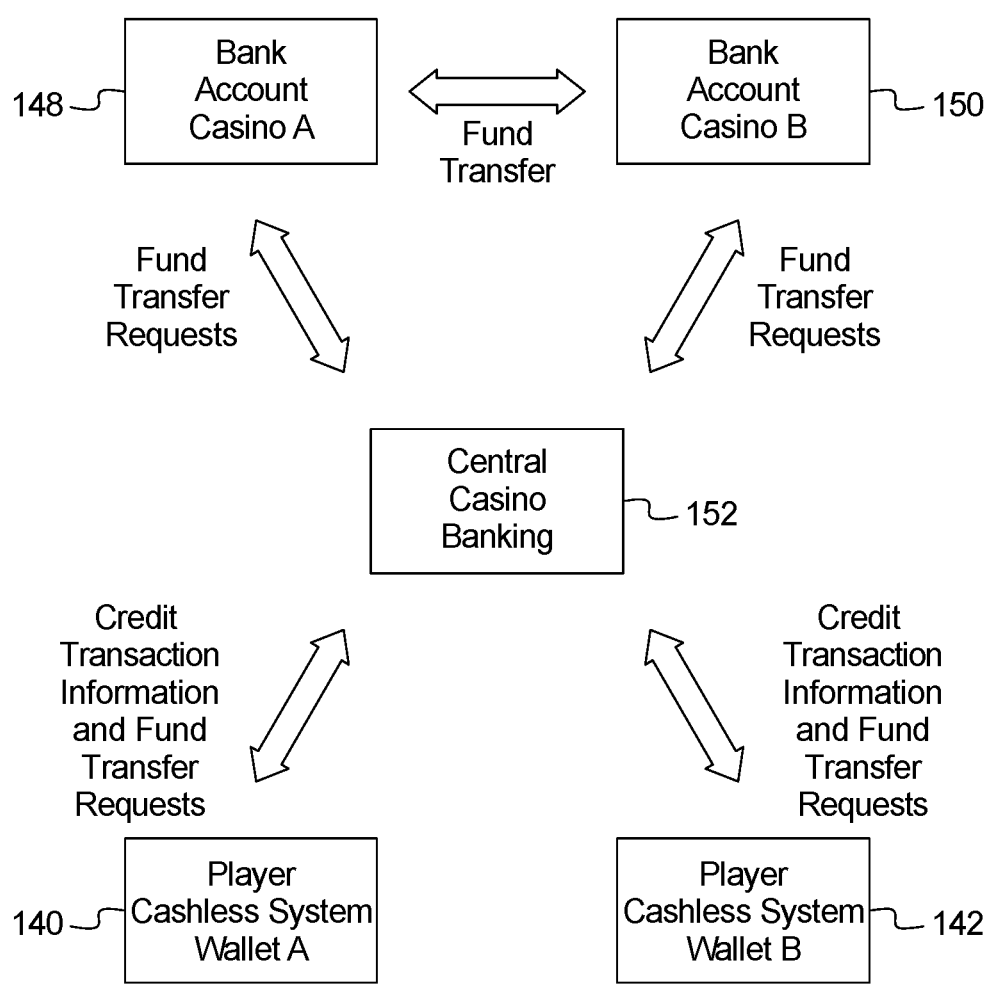
FIG. 1C is an example schematic configuration of the architecture of another embodiment of a plurality of different components utilized to transfer funds between different gaming establishment accounts associated with different financial institution accounts.

In certain embodiments, one or more servers of each individual gaming establishment fund management system communicates data regarding the transfer of funds between gaming establishment accounts to one or more servers of a central financial institution system associated with each of the gaming establishment fund management systems. In these embodiments, the one or more servers of the central financial institution system (which may be part of one of the gaming establishment fund management systems, part of one of the financial institutions associated with one of the gaming establishments or a separate system which integrates with the gaming establishment fund management systems and the financial institutions) then communicates data to complete the transfer of funds between the financial institution accounts which secure the gaming establishment accounts of the different gaming establishments that transferred the funds between each other. For example, as seen in FIG. 1C, in association with the transfer of an amount of funds between a cashless wagering account associated with a first gaming establishment (e.g., Player Cashless System Wallet A 140) and a cashless wagering account associated with a second gaming establishment (e.g., Player Cashless System Wallet B 142), the gaming establishment fund management system of the first gaming establishment and the gaming establishment fund management system of the second gaming establishment each communicate data regarding this transfer of an amount of funds and any applicable fund transfer requests to one or more servers of a central financial institution system associated with both the first gaming establishment fund management system and the second gaming establishment fund management system (e.g., Central Casino Banking System 152). In this example, upon receiving data from each gaming establishment fund management system, one or more servers of the central financial institution system communicates data which result in a transfer of an amount of funds (at least corresponding to the amount of funds transferred between the cashless wagering account associated with the first gaming establishment and the cashless wagering account associated with the second gaming establishment) between a first financial institution account (e.g., Bank Account Casino A 148) which secures the first cashless wagering account of the first gaming establishment and a second financial institution (e.g., Bank Account Casino B 150) which secures the second cashless wagering account of the second gaming establishment.

It should be appreciated that while the system of certain embodiments described herein provide that each gaming establishment account maintained for a user in association with each gaming establishment is part of a different gaming establishment fund management system, such gaming establishment accounts maintained for a user in association with each gaming establishment may alternatively be part of the same gaming establishment fund management system. That is, while certain embodiments describe a first gaming establishment fund management system (that maintains a first gaming establishment account of a first gaming establishment that is secured by a first financial institution account maintained by a first financial institution) transferring fund data to and from a second, different gaming establishment fund management system (that maintains a second gaming establishment account of a second, different gaming establishment that is secured by a second financial institution account maintained by a second financial institution), both the first gaming establishment account and the second gaming establishment account may be part of the same gaming establishment fund management system and secured by different financial institution accounts. Put differently, while certain embodiments described herein include each gaming establishment involved in the fund transfer being associated with an individual gaming establishment fund management system, each gaming establishment involved in the fund transfer may alternatively be associated with or part of the same gaming establishment fund management system. For example, different casino sites (which, per jurisdictional requirements, are each associated with a different financial institution account) associated with the same gaming establishment or gaming establishment brand may be part of the same gaming establishment fund management system or part of different gaming establishment fund management systems.

In certain embodiments, the transfer of funds between gaming establishment accounts maintained by one or more gaming establishment fund management systems of different gaming establishments occurs as part of the same transaction as the transfer of a corresponding amount of funds between different financial institution accounts associated with the different gaming establishments. That is, upon a determination that one gaming establishment account associated with a user lacks a sufficient amount of funds to accomplish a requested action, such as transferring an amount of funds to a credit balance of an EGM or transferring an amount of funds to a point-of-sale terminal of a retail point-of-sale system to purchase goods and/or services, the system integrates the transfer of funds from one gaming establishment account to another gaming establishment account with the transfer of at least a corresponding amount of funds from one financial institution account (which secures one of the gaming establishment accounts) to another financial institution account (which secures the other one of the gaming establishment accounts).

Figure 2A:
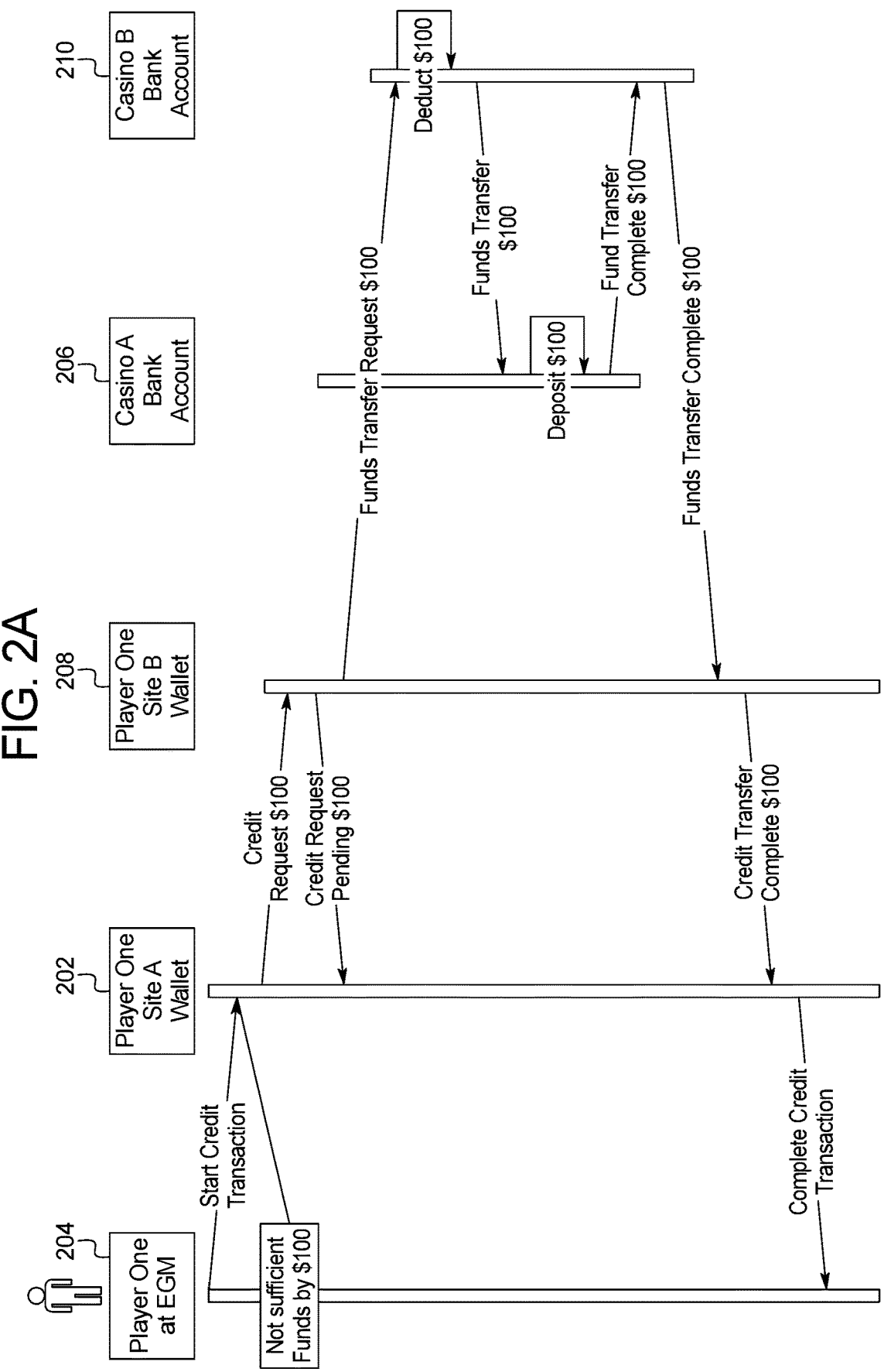
FIG. 2A is an example schematic diagram of one embodiment of the interactions between different gaming establishment fund management systems and different financial institutions to transfer funds between different gaming establishment accounts associated with different financial institution accounts.

For example, as seen in FIG. 2A, a first gaming establishment fund management system (not shown) maintains a first gaming establishment account 202 for a player at an EGM 204 which is secured by a first financial institution account 206 maintained by a first financial institution (not shown) and a second gaming establishment fund management system (not shown) maintains a second gaming establishment account 208 for the player which is linked to or otherwise associated with the first gaming establishment account and which is secured by a second financial institution account 210 maintained by a second financial institution (not shown). In this example, as seen in FIG. 2A, upon a determination that the first gaming establishment account associated with a player lacks a sufficient amount of funds to accomplish a requested action of transferring $100 to a credit balance of an EGM at a first gaming establishment, one or more servers of the first gaming establishment fund management system communicate data associated with a request of $100 to the second gaming establishment fund management system to draw $100 from the second gaming establishment account.

If the second gaming establishment fund management system authorizes the transfer of $100 from the second gaming establishment account to the first gaming establishment account, then prior to communicating data to the first gaming establishment fund management system to increase the first gaming establishment account by $100 (and prior to reducing the second gaming establishment account by $100 to reflect such a transfer), one or more servers of the second gaming establishment fund management system communicate data to the second financial institution to transfer $100 from the second financial institution account to the first financial institution account. That is, prior to communicating fund data to complete the transfer of funds from one gaming establishment account (which is secured by the funds in one financial institution account) to another gaming establishment account (which is secured by the funds in another financial institution account), the system disclosed herein communicates data regarding this authorized transfer to one or more of the financial institutions which maintain such financial institution accounts.

Upon receiving the request from the second gaming establishment fund management system, one or more servers of the second financial institution determine whether or not to authorize the transfer of $100. Upon a determination to authorize the transfer of $100 to the first financial institution account, the one or more servers of the second financial institution communicate data to one or more servers of the first financial institution to cause a transfer of $100 from the second financial institution account to the first financial institution account (which results in a reduction of the amount of funds in the second financial institution account by $100 and an increase of the amount of funds in the first financial institution account by $100). In addition to communicating data to one or more servers of the first financial institution to cause a transfer of $100 from the second financial institution account to the first financial institution account, upon a confirmation of the transfer of $100 to the first financial institution account, the one or more servers of the second financial institution communicate an authorization of transfer to the second gaming establishment fund management system. In this example, upon receiving such an authorization, the second gaming establishment fund management system completes the transfer of $100 from the second gaming establishment account to the first gaming establishment account (which results in a reduction of the amount of funds in the second gaming establishment account by $100 and an increase of the amount of funds in the first gaming establishment account by $100). As seen in this example, as part of the transfer of an amount of funds from one gaming establishment account maintained by one gaming establishment fund management system to another gaming establishment account maintained by another gaming establishment fund management system, the system causes a contemporaneous transfer of a corresponding amount of funds from one external account associated with one gaming establishment fund management system to another external account associated with another gaming establishment fund management system.

In certain embodiments, the transfer of funds between gaming establishment accounts maintained by one or more gaming establishment fund management systems of different gaming establishments and the transfer of a corresponding amount of funds between different financial institution accounts associated with the different gaming establishments occur sequentially. In certain such embodiments, upon a determination that one gaming establishment account associated with a user lacks a sufficient amount of funds to accomplish a requested action, such as transferring an amount of funds to a credit balance of an EGM or transferring an amount of funds to a point-of-sale terminal of a retail point-of-sale system to purchase goods and/or services, the system first transfers an amount of funds from one gaming establishment account to another gaming establishment account and then transfers at least a corresponding amount of funds from one financial institution account (which secures one of the gaming establishment accounts) to another financial institution account (which secures the other one of the gaming establishment accounts). In certain other embodiments, upon a determination that one gaming establishment account associated with a user lacks a sufficient amount of funds to accomplish a requested action, such as transferring an amount of funds to a credit balance of an EGM or transferring an amount of funds to a point-of-sale terminal of a retail point-of-sale system to purchase goods and/or services, the system first transfers at least a corresponding amount of funds from one financial institution account (which secures one gaming establishment account) to another financial institution account (which secures the gaming establishment account lacking the funds) and then transfers an amount of funds from one gaming establishment account to another gaming establishment account.

Figure 2B:
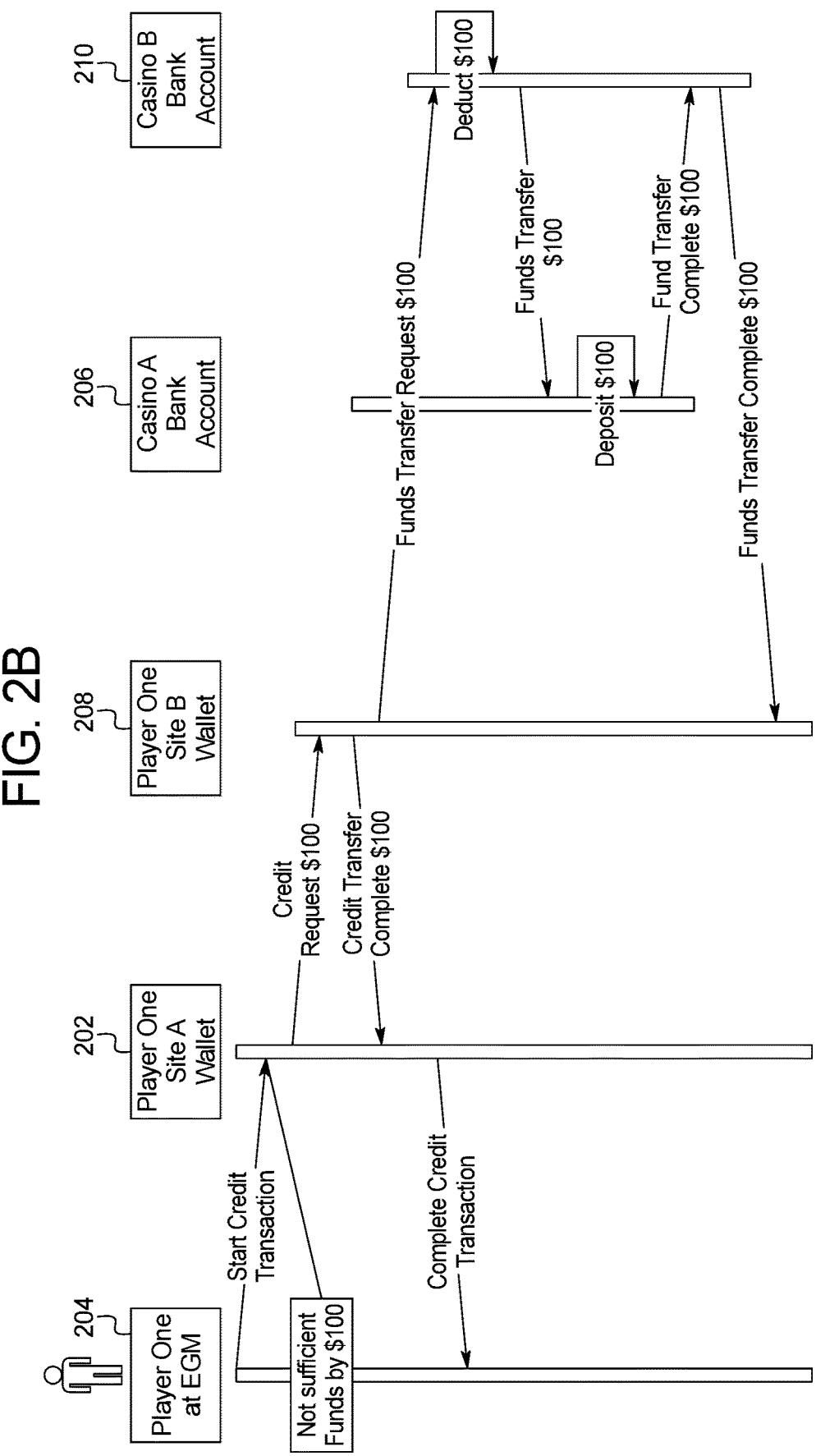
FIG. 2B is an example schematic diagram of another embodiment of the interactions between different gaming establishment fund management systems and different financial institutions to transfer funds between different gaming establishment accounts associated with different financial institution accounts.

For example, as seen in FIG. 2B, a first gaming establishment fund management system (not shown) maintains a first gaming establishment account 202 for a player at an EGM 204 which is secured by a first financial institution account 206 maintained by a first financial institution (not shown) and a second gaming establishment fund management system (not shown) maintains a second gaming establishment account 208 for the player which is linked to or otherwise associated with the first gaming establishment account and which is secured by a second financial institution account 210 maintained by a second financial institution (not shown). In this example, as seen in FIG. 2B, upon a determination that the first gaming establishment account associated with a player lacks a sufficient amount of funds to accomplish a requested action of transferring $100 to a credit balance of an EGM at a first gaming establishment, one or more servers of the first gaming establishment fund management system communicate data associated with a request of $100 to the second gaming establishment fund management system to draw $100 from the second gaming establishment account.

If the second gaming establishment fund management system authorizes the transfer of $100 from the second gaming establishment account to the first gaming establishment account, the second gaming establishment fund management system reduces the second gaming establishment account by $100 and communicates data to the first gaming establishment fund management system to increase the first gaming establishment account by $100. That is, in this example, the system communicates fund data to complete the transfer of funds from one gaming establishment account (which is secured by the funds in one financial institution account) to another gaming establishment account (which is secured by the funds in another financial institution account) independent of communicating data regarding this authorized transfer to one or more of the financial institutions which maintain such financial institution accounts.

Following the transfer of fund data between the servers of the first and second gaming establishment fund management systems, one or more servers of the second gaming establishment fund management system communicate data to the second financial institution to transfer $100 from the second financial institution account to the first financial institution account. Upon receiving the request from the second gaming establishment fund management system, one or more servers of the second financial institution determine whether or not to authorize the transfer of $100. Upon a determination to authorize the transfer of $100 to the first financial institution account, the one or more servers of the second financial institution communicate data to one or more servers of the first financial institution to cause a transfer of $100 from the second financial institution account to the first financial institution account (which results in a reduction of the amount of funds in the second financial institution account by $100 and an increase of the amount of funds in the first financial institution account by $100). In addition to communicating data to one or more servers of the first financial institution to cause a transfer of $100 from the second financial institution account to the first financial institution account, the one or more servers of the second financial institution communicate a confirmation of transfer to the second gaming establishment fund management system. As seen in this example, either prior to or after the transfer of an amount of funds from one gaming establishment account maintained by one gaming establishment fund management system to another gaming establishment account maintained by another gaming establishment fund management system, the system causes a transfer of a corresponding amount of funds from one external account associated with one gaming establishment fund management system to another external account associated with another gaming establishment fund management system.

In certain embodiments, the initiation of the transfer of funds between gaming establishment accounts maintained by one or more gaming establishment fund management systems of different gaming establishments triggers an initiation of the transfer of a corresponding amount of funds between different financial institution accounts associated with the different gaming establishments. In certain such embodiments, upon a determination that one gaming establishment account associated with a user lacks a sufficient amount of funds to accomplish a requested action, such as transferring an amount of funds to a credit balance of an EGM or transferring an amount of funds to a point-of-sale terminal of a retail point-of-sale system to purchase goods and/or services, the system initiates a first transfer of an amount of funds from one gaming establishment account to another gaming establishment account and also initiates a second transfer of at least a corresponding amount of funds from one financial institution account (which secures one of the gaming establishment accounts) to another financial institution account (which secures the other one of the gaming establishment accounts) wherein the system completes the first transfer independent of a completion of the second transfer. In these embodiments, while the first transfer of funds between gaming establishment accounts triggers the second transfer of funds between the financial institution accounts, the system does not wait for the second transfer of funds between financial institution accounts to complete to complete the first transfer of funds between gaming establishment accounts. For example, if the transfer of funds between financial institution accounts does not occur in real-time, such as automated clearing house ("ACH") transfers which may take up to three days to complete (e.g., if the transfer is initiated after a designated time on a Friday afternoon heading into a three-day holiday weekend), the system completes the transfer of funds between gaming establishment accounts even if the transfer of funds between financial institution accounts is not yet complete.

In certain embodiments, multiple transfers of funds between gaming establishment accounts maintained by one or more gaming establishment fund management systems of different gaming establishments and multiple transfers of corresponding amounts of funds between different financial institution accounts associated with the different gaming establishments occur sequentially. In these embodiments, upon a determination that one gaming establishment account associated with a user lacks a sufficient amount of funds to accomplish a requested action, such as transferring an amount of funds to a credit balance of an EGM or transferring an amount of funds to a point-of-sale terminal of a retail point-of-sale system to purchase goods and/or services, the system transfers an amount of funds from one gaming establishment account to another gaming establishment account and stores in one or more databases data associated with such a transfer. Upon a subsequent financial institution fund transfer triggering event (which may occur after zero, one or more additional transfers of funds between different gaming establishment accounts maintained for different users by one or more gaming establishment fund management systems associated with different gaming establishments), for each of such stored transfers which occurred, the system causes a transfer of at least a corresponding amount of funds from one financial institution account (which secures one of the gaming establishment accounts) to another financial institution account (which secures the other one of the gaming establishment accounts). This embodiment thus provides a batch settling process wherein the system aggregates each gaming establishment account to gaming establishment account fund transfer and upon a financial institution fund transfer triggering event, causes an amount of funds to be transferred between different financial institution accounts to reconcile each of these gaming establishment account fund transfers.

Figure 2C:
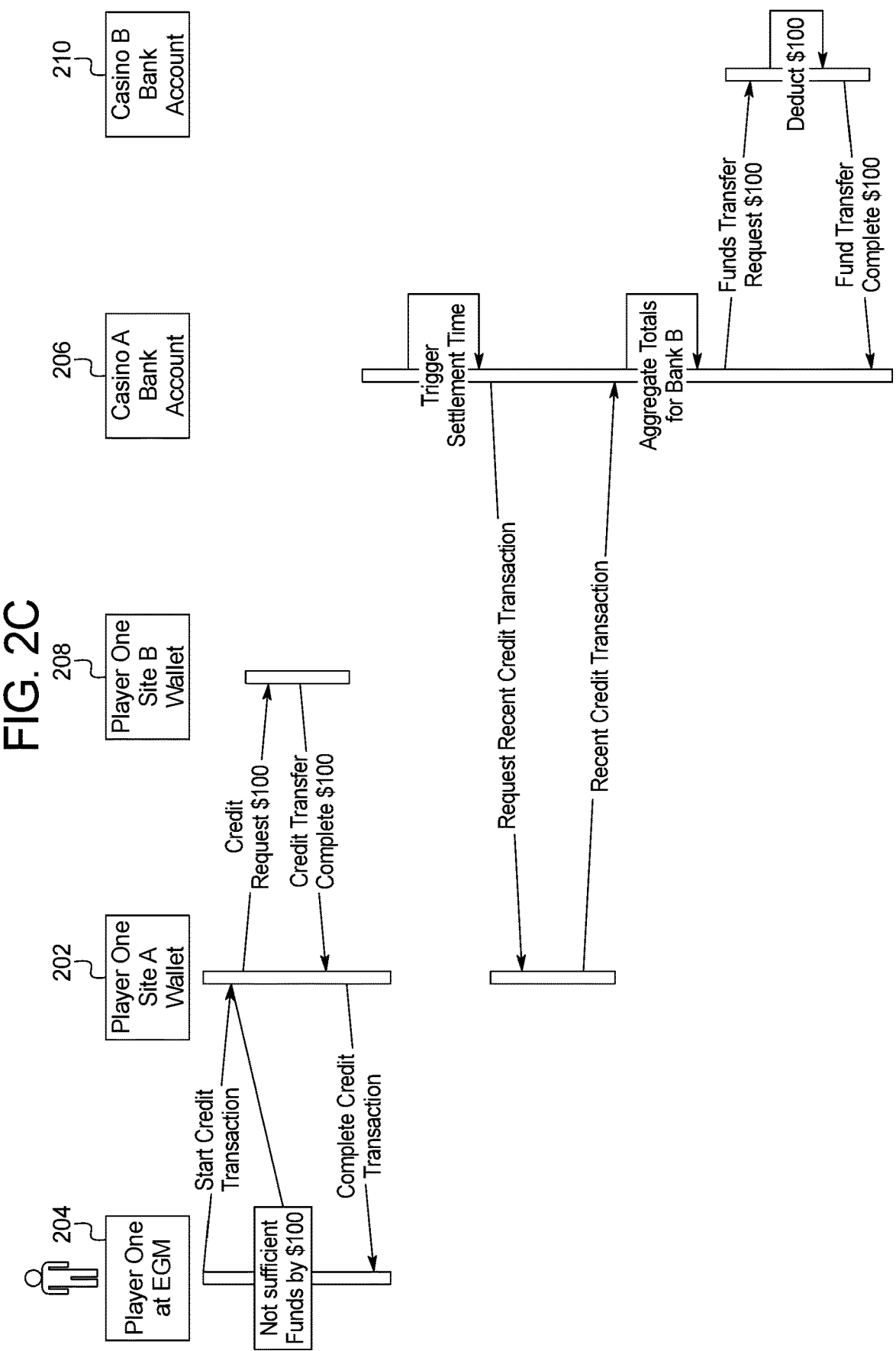
FIG. 2C is an example schematic diagram of another embodiment of the interactions between different gaming establishment fund management systems and different financial institutions to transfer funds between different gaming establishment accounts associated with different financial institution accounts.

For example, as seen in FIG. 2C, a first gaming establishment fund management system (not shown) maintains a first gaming establishment account 202 for a player at an EGM 204 which is secured by a first financial institution account 206 maintained by a first financial institution (not shown) and a second gaming establishment fund management system (not shown) maintains a second gaming establishment account 208 for the player which is linked to or otherwise associated with the first gaming establishment account and which is secured by a second financial institution account 210 maintained by a second financial institution (not shown). In this example, as seen in FIG. 2C, upon a determination that the first gaming establishment account associated with a player lacks a sufficient amount of funds to accomplish a requested action of transferring $100 to a credit balance of an EGM at a first gaming establishment, one or more servers of the first gaming establishment fund management system communicate data associated with a request of $100 to the second gaming establishment fund management system to draw $100 from the second gaming establishment account. If the second gaming establishment fund management system authorizes the transfer of $100 from the second gaming establishment account to the first gaming establishment account, the second gaming establishment fund management system reduces the second gaming establishment account by $100 and communicates data to the first gaming establishment fund management system to increase the first gaming establishment account by $100. Following such a transfer, one or more components of the first gaming establishment fund management system store or otherwise escrow the data associated this transfer for a subsequent reconciliation of corresponding financial institution accounts.

In this example, following such a transfer (and potentially one or more additional transfers of funds between different accounts associated with the same user or one or more different users maintained by one or more gaming establishment fund management systems) and upon an occurrence of a financial institution fund transfer triggering event, one or more servers of the first financial institution communicate data to one or more servers of the first gaming establishment fund management system to request data associated with each of the transfers that occurred that need to be reconciled. The one or more servers of the first gaming establishment fund management system then compile the one or more stored transfers awaiting reconciliation and communicates data associated with each of such transfers to one or more servers of the first financial institution. That is, upon a financial institution fund transfer triggering event, such as at a designated point in time and/or when a total amount of funds between gaming establishment accounts maintained in association with different gaming establishments reaches or exceeds a threshold amount of funds, the first gaming establishment fund management system aggregates the various outstanding gaming establishment account fund transfers that need to be reconciled (with corresponding fund transfers between financial institution accounts) to determine an aggregate amount of funds and reports such data to the appropriate financial institution.

In these embodiments, as seen in FIG. 2C, the one or more servers of the first financial institution communicate data to one or more servers of the second financial institution to request a transfer of the determined aggregate amount of funds from the second financial institution account to the first financial institution account. Upon receiving the request from the first financial institution, one or more servers of the second financial institution determine whether or not to authorize the transfer of the determined aggregate amount of funds. Upon a determination to authorize the transfer of the determined aggregate amount of funds to the first financial institution account, the one or more servers of the second financial institution communicate data to one or more servers of the first financial institution to cause a transfer of the determined aggregate amount of funds from the second financial institution account to the first financial institution account (which results in a reduction of the amount of funds in the second financial institution account by the determined aggregate amount of funds and an increase of the amount of funds in the first financial institution account by the determined aggregate amount of funds). As seen in this example, after one or more transfers of one or more amounts of funds from one or more gaming establishment accounts maintained by one gaming establishment fund management system to one or more gaming establishment accounts maintained by another gaming establishment fund management system, the system causes a batch transfer of a corresponding total amount of funds from one external account in communication with the one gaming establishment fund management system to another external account in communication with the other gaming establishment fund management system. Such a batch transfer enables multiple gaming establishment accounts to be reconciled upon a suitable financial institution fund transfer triggering event, such as at a designated point in time and/or when a total amount of funds between gaming establishment accounts maintained in association with different gaming establishments reaches or exceeds a threshold amount of funds.

In certain embodiments wherein the system processes a batch of gaming establishment account fund transfers in association with a financial institution fund transfer triggering event, the system creates one transfer of funds between financial institution accounts for each transfer of funds between gaming establishment accounts maintained by one or more gaming establishment fund management systems associated with different gaming establishments. In these embodiments, while the system processes a batch of gaming establishment account fund transfers upon a single occurrence of the financial institution fund transfer triggering event, the system treats each transfer as a separate transaction. In certain other embodiments wherein the system processes a batch of gaming establishment account fund transfers in association with a financial institution fund transfer triggering event, the system creates one transfer of funds between financial institution accounts for all of the transfers of funds between gaming establishment accounts maintained by one or more gaming establishment fund management systems associated with different gaming establishments. In these embodiments, the system processes a batch of gaming establishment account fund transfers upon a single occurrence of the financial institution fund transfer triggering event as a single transaction.

In certain embodiments wherein the system processes a batch of gaming establishment account fund transfers in association with a financial institution fund transfer triggering event, the system totals the batch of gaming establishment account fund transfers by each gaming establishment fund management system and proceeds to process a batch of transfers per gaming establishment fund management system. In these embodiments, upon a financial institution fund transfer triggering event, for each gaming establishment fund management system, the system processes one transfer, if applicable, to each of the other gaming establishment fund management systems and/or one transfer, if applicable, from each of the other gaming establishment fund management systems.

In certain embodiments wherein the system processes a batch of gaming establishment account fund transfers in association with a financial institution fund transfer triggering event, for each transfer of funds between gaming establishment accounts maintained by one or more gaming establishment fund management systems associated with different gaming establishments, the system notifies one or more servers of the corresponding financial institution of the transfer but the one or more servers do not initiate any transfer of any corresponding amount of funds between financial institution accounts until the financial institution fund transfer triggering event occurs. In one such embodiment, the system notifies one or more servers of the corresponding financial institution of the transfer when the gaming establishment account fund transfer occurs. In another such embodiment, the system notifies one or more servers of the corresponding financial institution of the transfer on a periodic basis.

In certain embodiments, the system automatically causes the transfer of funds from one financial institution account to another financial institution (either as an individual transfer or as a batch transfer) to reconcile a transfer of funds from one gaming establishment account to another gaming establishment account. In certain embodiments, the system causes the transfer of funds from one financial institution account to another financial institution (either as an individual transfer or as a batch transfer) to reconcile a transfer of funds from one gaming establishment account to another gaming establishment account responsive to one or more inputs received, such as a request from a financial institution which maintains a financial account associated with the transfer or a request from a gaming establishment fund management system to reconcile the funds.

In certain embodiments, upon a suitable report generation triggering event, the system generates one or more reports regarding the transfer of funds between financial institution accounts that needs to occur. In one such embodiment, rather than automatically causing the transfer of funds from one financial institution account to another financial institution (either as an individual transfer or as a batch transfer) to reconcile a transfer of funds from one gaming establishment account to another gaming establishment account, personnel of one or more of the financial institutions and/or one or more of the gaming establishments utilize such a generated report to manually request the transfer of funds from one financial institution account to another financial institution to reconcile a transfer of funds from one gaming establishment account to another gaming establishment account. In one such embodiment, the generated report is in a standard format, such as an ACH file, that can be manually uploaded to a financial institution to reconcile one or more transfers of funds from one gaming establishment account to another gaming establishment account.

In certain embodiments, in addition to transferring funds to a first gaming establishment account associated with a first gaming establishment from a second gaming establishment account associated with a second gaming establishment and reconciling such a transfer of funds with a corresponding transfer of funds to a first financial institution account associated with the first gaming establishment from a second financial institution account associated with the second gaming establishment, the system enables funds to be transferred to a gaming establishment account from a third-party account, such as one or more credit card accounts, one or more debit card accounts and/or one or more third-party maintained accounts (e.g., one or more PayPal® accounts or Venmo® accounts). In other embodiments, the system enables funds to be transferred to a gaming establishment account via a mobile device electronic fund transfer, such using Apple Pay™ or Android Pay™. In various embodiments, the system utilizes a mobile device running a mobile device application, a kiosk, an EGM and/or a gaming establishment interface to facilitate this transfer of funds from a third-party account.

In certain embodiments, in addition to transferring funds to a first gaming establishment account associated with a first gaming establishment from a second gaming establishment account associated with a second gaming establishment and reconciling such a transfer of funds with a corresponding transfer of funds to a first financial institution account associated with the first gaming establishment from a second financial institution account associated with the second gaming establishment, the system enables funds to be deposited in a gaming establishment account via drawing funds from a gaming establishment credit system which issues the player a line of credit or marker. In various embodiments, the system utilizes a mobile device running a mobile device application, a kiosk, an EGM and/or a gaming establishment interface to facilitate these transfer(s) of funds from the gaming establishment credit system.

In certain embodiments, in addition to transferring funds to a first gaming establishment account associated with a first gaming establishment from a second gaming establishment account associated with a second gaming establishment and reconciling such a transfer of funds with a corresponding transfer of funds to a first financial institution account associated with the first gaming establishment from a second financial institution account associated with the second gaming establishment, the system enables funds to be deposited in a gaming establishment account via an EGM. In certain embodiments, the system enables a player that has an amount of cash to utilize an EGM to convert the cash to an amount deposited into a gaming establishment account. In other embodiments, the system enables funds to be deposited in a gaming establishment account via an EGM that accepts printed ticket vouchers (i.e., a bearer instrument redeemable for cash or game play on the EGM). In these embodiments, the system enables a player that has one or more printed ticket vouchers to utilize an EGM to convert the printed ticket voucher to an amount deposited into a gaming establishment.

In certain embodiments, in addition to transferring funds to a first gaming establishment account associated with a first gaming establishment from a second gaming establishment account associated with a second gaming establishment and reconciling such a transfer of funds with a corresponding transfer of funds to a first financial institution account associated with the first gaming establishment from a second financial institution account associated with the second gaming establishment, the system enables funds to be deposited in a gaming establishment account via a gaming establishment interface, such as a casino desk. In certain embodiments, the system enables a player that has an amount of cash to utilize a gaming establishment interface, such as a casino desk to convert the cash to an amount deposited into a gaming establishment account. In other embodiments, the system enables funds to be deposited in a gaming establishment account via a gaming establishment interface that accepts printed ticket vouchers. In these embodiments, the system enables a player that has one or more printed ticket vouchers to utilize a gaming establishment interface to convert the printed ticket voucher to an amount deposited into a gaming establishment account.

In certain embodiments, in addition to transferring funds to a first gaming establishment account associated with a first gaming establishment from a second gaming establishment account associated with a second gaming establishment and reconciling such a transfer of funds with a corresponding transfer of funds to a first financial institution account associated with the first gaming establishment from a second financial institution account associated with the second gaming establishment, the system enables funds to be deposited in a gaming establishment account via a kiosk that accepts money. In certain embodiments, the system enables a player that has an amount of cash to utilize a kiosk to convert the cash to an amount deposited into a gaming establishment account. In other embodiments, the system enables funds to be deposited in a gaming establishment account via a kiosk that accepts printed ticket vouchers. In these embodiments, the system enables a player that has one or more printed ticket vouchers to utilize a kiosk to convert the printed ticket voucher to an amount deposited into a gaming establishment account.

In certain embodiments, in addition to transferring funds to a first gaming establishment account associated with a first gaming establishment from a second gaming establishment account associated with a second gaming establishment and reconciling such a transfer of funds with a corresponding transfer of funds to a first financial institution account associated with the first gaming establishment from a second financial institution account associated with the second gaming establishment, the system enables a player associated with an amount of virtual ticket vouchers to utilize an EGM, a mobile device running an application, a kiosk and/or a gaming establishment interface to convert the virtual ticket vouchers to an amount deposited into a gaming establishment account.

It should be appreciated that while the above example embodiments are described in relation to utilizing a mobile device to facilitate the transferring one or more amounts of money or units of currency from a kiosk to a gaming establishment account, such example embodiments may also be used to transfer, either as an isolated transaction or as part of an operation mode of a gaming establishment device, one or more amounts of money or units of currency from an EGM to a gaming establishment account and/or from a gaming establishment interface, such as a casino desk, to a gaming establishment account.

Utilizing Mobile Device with Gaming Establishment Device

In various embodiments, after pairing a mobile device with a gaming establishment device, such as an EGM or a component of a gaming establishment system supported by a cabinet of a gaming establishment device, such as a component of a gaming establishment management system supported by an EGM cabinet, the mobile device application communicates one or more requested actions to be performed to the gaming establishment device. It should be appreciated that while certain data or information pertaining to one or more of the requested actions are communicated from a gaming establishment device (or a component of a gaming establishment device, such as a component of a gaming establishment management system supported by or otherwise located inside the gaming establishment device) to a mobile device, such data or information may additionally or alternatively be communicated: (i) from one or more servers to a mobile device via one or more wireless communication protocols, or (ii) from a gaming establishment device to one or more servers via one or more wireless communication protocols and then from one or more servers to a mobile device via one or more wireless communication protocols.

It should be further appreciated that any functionality or process described herein may be implemented via one or more servers, a gaming establishment device, one or more components of a gaming establishment device (such as a component of a gaming establishment management system supported by or otherwise located inside the gaming establishment device), or a mobile device application. For example, while certain data or information described herein is explained as being communicated from a gaming establishment device or a component of a gaming establishment management system supported by or otherwise located inside the gaming establishment device to a mobile device via one or more wireless communication protocols, such data or information may additionally or alternatively be communicated from one or more servers to a mobile device via one or more wireless communication protocols. Accordingly: (i) while certain functions, features or processes are described herein as being performed by a gaming establishment device, such as an EGM, such functions, features or processes may alternatively be performed by one or more servers, or one or more mobile device applications, or one or more components of a gaming establishment management system supported by or otherwise located inside the gaming establishment device), (ii) while certain functions, features or processes are described herein as being performed by one or more mobile device applications, such functions, features or processes may alternatively be performed by one or more servers, or one or more gaming establishment devices, or one or more components of a gaming establishment management system supported by or otherwise located inside the gaming establishment device, (iii) while certain functions, features or processes are described herein as being performed by one or more servers, such functions, features or processes may alternatively be performed by one or more gaming establishment devices, or one or more mobile device applications, or one or more components of a gaming establishment management system supported by or otherwise located inside the gaming establishment device, and (iv) while certain functions, features or processes are described herein as being performed by one or more components of a gaming establishment management system, such functions, features or processes may alternatively be performed by one or more gaming establishment devices, or one or more mobile device applications, or one or more servers.

It should also be appreciated that while described below as various requested actions being performed in association with an EGM, such requested actions may additionally or alternatively be performed in association with any suitable gaming establishment device located in a gaming establishment, such as an electronic gaming table, a gaming terminal associated with one or more gaming tables, or a kiosk which receives wagers such as wagers on sporting events and/or any suitable gaming establishment device located in a non-gaming area of a gaming establishment, such as a point-of-sale terminal located in a retail area of a gaming establishment. Moreover, while described below as transferring funds to a gaming establishment account of a gaming establishment fund management system, from a gaming establishment of a gaming establishment fund management system and/or between gaming establishment accounts of one or more gaming establishment fund management systems, such funds may take any suitable form, where applicable, including, but not limited to, cashable credits, non-cashable credits, and/or promotional credits.

Player Accounts

In certain embodiments, the action to be performed includes enabling the player to log into a casino loyalty account, such as a player tracking account, via a wireless communication protocol, utilizing a mobile device application executed by a mobile device.

In various embodiments, following the launching of the mobile device application, such as following the player selecting an image associated with an electronic casino loyalty account card stored via a digital wallet application or following the mobile device application retrieving data associated with a player loyalty account stored via a digital wallet application, the mobile device application prompts the player to cause the mobile device to engage the EGM, such as prompting the player to tap the mobile device to a card reader or other designated location(s) of the EGM. After such engagement (or after the launching of the mobile device application if no mobile device to EGM engagement is required), the mobile device application communicates, via a wireless communication protocol, player loyalty account data stored by the mobile device to the EGM (or a component of the EGM). The EGM proceeds with operating with a player loyalty system (i.e., a player tracking system) to log the player into the player loyalty account at that EGM. Thereafter, any game play activity is associated with this player loyalty account (just as if the player would have inserted a physical player tracking card into a player tracking card reader of the EGM).

In certain embodiments, the action to be performed includes enabling the player to log out of a casino loyalty account, such as a player tracking account, via a wireless communication protocol, utilizing a mobile device application executed by a mobile device. In certain embodiments, upon receiving one or more "cash out" inputs or "log out" inputs from the player, the mobile device application facilitates a logging out of the casino loyalty account. In certain other embodiments, if the system determines that no activity has occurred for a designated amount of time, or if the system determines that another player is attempting to log onto the EGM, the mobile device application facilitates a logging out of the casino loyalty account. In these embodiments, such logging out of the casino loyalty account is associated with a termination of the player's current gaming session. Specifically, the EGM proceeds with operating with a player loyalty system (i.e., a player tracking system) to log the player out of the player loyalty account at that EGM to complete the player tracking session at the EGM.

In certain embodiments, the action to be performed additionally or alternatively includes enabling the player to log into a cashless wagering account, via a wireless communication protocol, utilizing a mobile device application executed by a mobile device. In certain such embodiments, following the launching of the mobile device application, such as following the player selecting an image associated with an electronic casino loyalty account card stored via a digital wallet application or following the mobile device application retrieving data associated with a cashless wagering account stored via a digital wallet application, the mobile device application prompts the player to cause the mobile device to engage the EGM, such as prompting the player to tap the mobile device to a card reader or other designated location(s) of the EGM. After such engagement (or after the launching of the mobile device application if no mobile device to EGM engagement is required), the mobile device application communicates, via a wireless communication protocol, player cashless wagering account data stored by the mobile device to the EGM. The EGM proceeds with operating with the cashless wagering system to log the player into a cashless wagering account associated with the player.

In one embodiment, the system determines a balance of the cashless wagering account associated with the player and causes the EGM to communicate, via one or more wireless communication protocols, the determined cashless wagering account balance to the mobile device. In another embodiment, the system determines a balance of the cashless wagering account associated with the player and communicates, via one or more wireless communication protocols, the determined cashless wagering account balance(s) to the mobile device.

Transfer of Funds from Gaming Establishment Account to Gaming Establishment Wagering Device In certain embodiments, the action to be performed additionally or alternatively includes enabling the player to facilitate the transfer of funds from a gaming establishment account, described herein as a cashless wagering account, to a gaming establishment wagering device, described herein as an EGM, utilizing a mobile device application executed by a mobile device. In certain such embodiments, following the launching of the mobile device application, such as following the player selecting an image associated with an electronic casino loyalty account card stored via a digital wallet application or following the mobile device application retrieving data associated with a cashless wagering account stored via a digital wallet application, the mobile device application determines an amount of funds to be transferred from the cashless wagering account to the EGM.

In one embodiment, the mobile device application enables the player to select an amount of funds to be transferred from a listing of available amounts of funds to be transferred from the cashless wagering account to the EGM. In different embodiments, the listing of available amounts to be transferred is previously selected by the player, selected by a gaming establishment or selected by a third-party. In certain embodiments, the mobile device application enables the player, a gaming establishment and/or a third-party to modify the listing of available amount of funds. In another embodiment, the mobile device application determines the listing of available amount of funds based on one or more characteristics associated with the player, such as the player's prior amounts transferred, the player's wagering history, and/or the player's status. In another embodiment, the mobile device application determines the listing of available amount of funds based on one or more characteristics associated with the EGM, such as based on the denomination, game type, minimum bet and/or maximum available wager amount of the EGM.

In one embodiment, the mobile device application includes more than one listing of available amounts of funds to be transferred. In this embodiment, the mobile device application includes one listing of available amounts for an initial transfer of funds to the EGM for a gaming session (i.e., a first listing of amounts to initially establish a credit balance of an EGM) and another listing of available amounts for a subsequent transfer of funds to the EGM for an existing gaming session (i.e., a second listing of amounts to modify a previously established credit balance of the EGM).

In another embodiment, the mobile device application determines a default amount of funds to be transferred from the cashless wagering account to the EGM. In one such embodiment, the default amount of funds includes the last amount of funds transferred from the cashless wagering account to the EGM. In another such embodiment, the default amount of funds includes the last amount of funds transferred from the EGM to the cashless wagering account. The mobile device application displays to the player such a default amount of funds to be transferred.

In different embodiments, the default amount to be transferred is previously selected by the player, selected by a gaming establishment or selected by a third-party. In certain embodiments, the mobile device application enables the player, a gaming establishment and/or a third-party to modify the default amount of funds displayed by the mobile device application. In another embodiment, the mobile device application determines the default amount of funds based on one or more characteristics associated with the player, such as the player's prior amounts transferred, the player's wagering history, the player's credit balance, or the player's status.

In one embodiment, the mobile device application includes more than one default amount of funds to be transferred. In this embodiment, the mobile device application includes one default amount for an initial transfer of funds to the EGM for a gaming session (i.e., a first default amount to initially establish a credit balance of an EGM) and another default amount for a subsequent transfer of funds to the EGM for an existing gaming session (i.e., a second default amount to modify a previously established credit balance of the EGM).

In certain embodiments, following the determination of an amount of funds to be transferred from the cashless wagering account to the EGM, the mobile device application prompts the player to cause the mobile device to engage the EGM, such as prompting the player to tap the mobile device to a player tracking card reader or other designated location (s) of the EGM. After such engagement (or after the determination of an amount of funds to be transferred if no mobile device to EGM engagement is required), the mobile device application communicates, via a wireless communication protocol, data associated with the determined amount of funds to be transferred from the cashless wagering account to the EGM.

In these embodiments, after the data associated with the determined amount of funds to be transferred from the cashless wagering account to the EGM is wirelessly communicated, the EGM proceeds with operating with a cashless wagering system to log the player into a cashless wagering account associated with the player (if necessary) and request the determined amount of funds to be transferred from the cashless wagering account to the EGM.

In another embodiment, rather than prompting the player to engage the EGM with the mobile device and the subsequent engagement of the EGM with the mobile device, the mobile device application automatically determines to transfer a default amount of funds, such as the last transferred amount of funds, from the cashless wagering account to the EGM. In this embodiment, the mobile device application communicates, via a wireless communication protocol, data associated with the determined amount of funds to be transferred from the cashless wagering account to the EGM. The EGM proceeds with operating with a cashless wagering system to log the player into a cashless wagering account associated with the player (if necessary) and request the determined amount of funds to be transferred from the cashless wagering account to the EGM.

Following the EGM requesting the determined amount of funds, the cashless wagering system determines whether to authorize the transfer of the determined amount of funds. If the cashless wagering system determines not to authorize the determined amount of funds, the cashless wagering system communicates a denial to the EGM and/or the mobile device application, wherein the EGM and/or mobile device application display a denial of funds transfer to the player.

On the other hand, if the cashless wagering system determines to authorize the determined amount of funds, the cashless wagering system updates the cashless wagering account associated with the player and communicates an authorization to the EGM. The cashless wagering system reduces a balance of the cashless wagering account by the reduced amount of funds. The EGM proceeds with updating a credit balance of the EGM to account for the determined amount of funds. In certain embodiments, the EGM further proceeds with communicating a transfer of funds confirmation to the mobile device, wherein the mobile device application displays a confirmation of the transfer of the amount of funds and/or the updated credit balance of the EGM. Such a transfer amount of funds is available for wagering by the player or transferring to a gaming establishment retail account (via the cashless wagering account as described herein).

In certain embodiments, the action to be performed additionally or alternatively includes automatically initiating the transfer of funds from a cashless wagering account to the EGM utilizing the mobile device application. In one such embodiment, the gaming system includes an automatic reload feature wherein if a credit balance of the EGM falls below a threshold level, the mobile device automatically initiates a transfer of an amount of funds from the cashless wagering account to the EGM to facilitate additional wagering opportunities. It should be appreciated that, in certain embodiments, the gaming system enables the player to enable or disable such an automatic reload feature.

In certain embodiments, the action to be performed additionally or alternatively includes enabling the player to transfer funds from a virtual ticket voucher to the EGM utilizing a mobile device application executed by a mobile device. In certain embodiments, following the launching of the mobile device application, such as following the player selecting an image associated with an electronic casino loyalty account card stored via a digital wallet application, the mobile device application determines an amount of funds to be transferred to the EGM via the redemption of a virtual ticket voucher.

In these embodiments, the mobile device application displays to the player images representing any virtual ticket vouchers associated with the mobile device. The mobile device application enables the player to select one or more images representing one or more virtual ticket vouchers associated with the mobile device (i.e., one or more inputs made at the mobile device). In these embodiments, similar to as described above with respect to the transfer of funds from a cashless wagering account to an EGM via a mobile device application, following the determination of which virtual ticket vouchers are to be transferred from the mobile device application to the EGM, the mobile device application prompts the player to cause the mobile device to engage the EGM. The mobile device application then communicates, via a wireless communication protocol, data associated with the selected virtual ticket voucher to be transferred. The EGM then communicates with one or more servers, such as a virtual ticket voucher server, to request the selected virtual ticket voucher (and more specifically the amount of funds associated with the selected virtual ticket voucher) be transferred from to the EGM. The server then determines whether to authorize the transfer of the selected virtual ticket voucher. If the transfer of the selected virtual ticket voucher is authorized: (i) the server updates a database of virtual ticket vouchers to reflect the redemption of the selected virtual ticket voucher, (ii) the EGM proceeds with updating a credit balance of the EGM to account for the amount of funds associated with the selected virtual ticket voucher, (iii) a transfer of funds confirmation is communicated to and displayed by the mobile device, and (iv) the amount of funds associated with the selected virtual ticket voucher are available for wagering by the player.

In certain other embodiments, following a full or partial depletion of a credit balance of the EGM, the EGM wirelessly communicates with the mobile device and queries the mobile device for the presence of any additional virtual ticket vouchers associated with the mobile device application. That is, when the credit balance of the EGM is empty, when the credit balance of the EGM has less than an amount of credits to repeat a previous wager, when the credit balance of the EGM has less credits than a minimum wager and/or when the credit balance of the EGM is below a designated threshold amount, the EGM communicates with the mobile device to determine if the mobile device application is associated with any additional available virtual ticket vouchers. If no additional virtual ticket vouchers are available, the EGM prompts the player to fund the credit balance of the EGM via another funding avenue as disclosed herein. On the other hand, if at least one virtual ticket voucher is available, the EGM operates with the mobile device to facilitate the transfer of such at least one virtual ticket voucher to the EGM. In one such embodiment, the mobile device application communicates a listing of available virtual ticket vouchers to the EGM. The EGM proceeds with displaying the listing of available virtual ticket vouchers and enables the player to select, at the EGM, one or more of the available virtual ticket vouchers to redeem. If the player selects one or more of the available virtual ticket vouchers, the EGM communicates the player's selection to the mobile device and the mobile device application proceeds with facilitating the transfer of such virtual ticket vouchers to the EGM as described herein. It should be appreciated that this embodiment enables a player to utilize a mobile device to facilitate the transfer funds, such as transfer of funds associated with one or more virtual ticket vouchers associated with the mobile device, without having to reengage the EGM with the mobile device.

In certain other embodiments, following a full or partial depletion of a credit balance of the EGM, the EGM wirelessly communicates with the mobile device (or communicates with one or more server which communicate with the EGM) and queries the mobile device for the presence of any additional virtual ticket vouchers associated with the mobile device application. If no additional virtual ticket vouchers are available, the EGM prompts the player to fund the credit balance of the EGM via another funding avenue as disclosed herein. On the other hand, if at least one virtual ticket voucher is available, the mobile device application proceeds with facilitating the automatic transfer of the at least one virtual ticket voucher to the EGM as described herein. It should be appreciated that this embodiment enables a player to automatically transfer funds, such as transfer of funds associated with one or more virtual ticket vouchers associated with the mobile device, via the mobile device without the player having to reengage the EGM with the mobile device and without the player having to prompt either the EGM or the mobile device application to initiate such a transfer. It should be further appreciated that, in certain embodiments, the gaming system enables the player to enable or disable such an automatic "transfer of virtual ticket vouchers" feature.

In another embodiment, the EGM periodically communicates information to the mobile device regarding the status or amount of the credit balance of the EGM. In one such embodiment, based on this communicated information, the mobile device application determines when to alert the player to potentially transfer additional funds to the EGM utilizing the mobile device application. For example, the mobile device application could vibrate the mobile device, or create a sound, which alerts the player to view the mobile device application and select which additional funds to virtually insert into or load on the EGM. In another such embodiment, based on this communicated information, the mobile device application determines when to automatically transfer one or more additional and available virtual ticket vouchers to the EGM.

Transfer of Funds from Gaming Establishment Wagering Device to Gaming Establishment Account In certain embodiments, the action to be performed additionally or alternatively includes enabling the player to transfer funds from a gaming establishment wagering device, described herein as an EGM, to a gaming establishment account, described herein as a cashless wagering account, utilizing a mobile device application executed by a mobile device. That is, the system of this disclosure enables a player to transfer winnings or other unused funds from the EGM to a cashless wagering account in association with the mobile device application. In certain such embodiments, following the launching of the mobile device application, such as following the player selecting an image associated with an electronic casino loyalty account card stored via a digital wallet application or following the mobile device application retrieving data associated with a cashless wagering account stored via a digital wallet application, and receiving one or more "cash out" inputs from the player, the mobile device application determines an amount of funds to be transferred from the EGM to the cashless wagering account.

In one embodiment, the mobile device application enables the player to select an amount to be transferred from the EGM to the cashless wagering account. In one such embodiment, the mobile device application enables the player to select a portion of the credit balance of the EGM (i.e., less than the entire credit balance) to be transferred from the EGM to the cashless wagering account. In various examples, the mobile device application automatically selects an amount of any winnings (i.e., an amount of the credit balance over the initial credit balance), an amount of winnings over a designated amount, an amount of a last win (i.e., an award amount associated with the last played game) or an amount of a last win over a designated amount (i.e., an award amount associated with the last played game over a designated award amount) to be transferred from the EGM to the cashless wagering account. In another embodiment, the mobile device application determines to transfer the credit balance of the EGM from the EGM to the cashless wagering account.

In certain embodiments, following the determination of an amount of funds to be transferred from the EGM to the cashless wagering account, the mobile device application prompts the player to cause the mobile device to engage the EGM, such as prompting the player to tap the mobile device to a player tracking card reader or other designated location(s) of the EGM.

In certain other embodiments, the system determines to facilitate the transfer of funds from the EGM to the cashless wagering account independent of any input by the player and/or independent of any engagement between the mobile device and the EGM. In one such embodiment, if the system determines that no activity has occurred for a designated amount of time, as a precautionary measure, the system transfers the credit balance of the EGM from the EGM to the cashless wagering account used to transfer funds to the EGM. In another embodiment, if the system determines that another player is attempting to log onto the EGM, as a precautionary measure, the system transfers the credit balance of the EGM from the EGM to the cashless wagering account used to transfer funds to the EGM. Such transfers of the credit balance to the cashless wagering account is associated with a termination of the player's current gaming session.

After any engagement between the mobile device and the EGM (or after the determination of an amount of funds to be transferred if no mobile device to EGM engagement is required), the mobile device application communicates, via a wireless communication protocol, data associated with the determined amount of funds to be transferred from the EGM to the cashless wagering account. The EGM proceeds with operating with a cashless wagering system to log the player into a cashless wagering account associated with the player (or confirm that the player remains logged into the cashless wagering account) and request the determined amount of funds to be transferred from the EGM to the cashless wagering account. Following such a request, the EGM proceeds with updating a credit balance of the EGM to account for the determined amount of funds transferred from the EGM to the cashless wagering account. The cashless wagering system additionally updates the cashless wagering account associated with the player (i.e., the cashless wagering system adds the determined amount of funds to the cashless wagering account) and communicates a confirmation to the EGM. The EGM further proceeds with communicating a transfer of funds confirmation to the mobile device, wherein the mobile device application displays a confirmation of the transfer of the amount of funds and/or the updated credit balance of the EGM. Such a transferred amount of funds is available in the player's cashless wagering account to be transferred to another EGM or transferred to a gaming establishment retail account as described here.

In certain embodiments, the action to be performed additionally or alternatively includes automatically initiating a transfer of funds from the EGM to a cashless wagering account utilizing the mobile device application. In one such embodiment, the gaming system includes an automatic "cash out" feature wherein if a credit balance of the EGM reaches above a threshold level, following a player's input at the EGM to confirm this transfer, the mobile device automatically transfers an amount of funds from the EGM to the cashless wagering account. Such an automatic "cash out" feature is associated with a termination of the player's current gaming session. It should be appreciated that, in certain embodiments, the gaming system enables the player to enable or disable such an automatic "cash out" feature.

It should be appreciated that the mobile device facilitated fund data transfers of the present disclosure may occur in addition to or as an alternative from cash-based fund transfers and/or ticket voucher-based fund transfers. In one such embodiment, an EGM of the present disclosure is funded via any of a mobile device facilitated fund transfer, a cash-based fund transfer or a ticket voucher-based fund transfer. In another embodiment, a credit balance of an EGM of the present disclosure is cashed out via any of a mobile device facilitated fund transfer, a cash-based fund transfer or a ticket voucher-based fund transfer. In another embodiment, an EGM of the present disclosure is funded via a mobile device facilitated fund transfer or a cash-based fund transfer (but is not funded via any ticket voucher-based fund transfer). In another embodiment, a credit balance of an EGM of the present disclosure is cashed out via a mobile device facilitated fund transfer or a cash-based fund transfer (but is not cashed out via any ticket voucher-based fund transfer). In another embodiment, an EGM of the present disclosure is funded via a mobile device facilitated fund transfer or a ticket voucher-based fund transfer (but is not funded via any cash-based fund transfer). In another embodiment, a credit balance of an EGM of the present disclosure is cashed out via a mobile device facilitated fund transfer or a ticket voucher-based fund transfer (but is not cashed out via any cash-based fund transfer). In another embodiment, an EGM of the present disclosure is funded via a mobile device facilitated fund transfer (but is not funded via a cash-based fund transfer nor a ticket voucher-based fund transfer). In another embodiment, a credit balance of an EGM of the present disclosure is cashed out via a mobile device facilitated fund transfer (but is not cashed out via a cash-based fund transfer nor a ticket voucher-based fund transfer).

Transfer of Funds Between External Account and Gaming Establishment Account

In certain embodiments, the action to be performed additionally or alternatively includes enabling the player to transfer funds from an external account, authorizing any establishment of a line of credit (if the funds to be transferred from the external funding source which maintains the external account takes more than a designated period of time) and/or drawing upon a line of credit. Put differently, facilitated by the mobile device application, the system enables the player to fund one or more accounts from one or more external sources and access one or more lines of credits based on the establishment and drawing down of a line of credit.

In certain embodiments, the cashless wagering account is associated with one or more external accounts, such as one or more credit card accounts, one or more debit card accounts and/or one or more third-party maintained accounts (e.g., one or more PayPal® accounts or Venmo® accounts). In certain such embodiments, the gaming system enables a player to transfer an amount of funds to such an external account. For example, after a player utilizes the mobile device application to "cash out" an amount of winnings or unused funds from the EGM and after the player has confirmed this "cash out" via one or more inputs made at the EGM, the system enables the player to proceed with transferring, part or all of the amount of winnings or unused funds to one or more external accounts.

Transfer of Funds Between Different Gaming Establishment Accounts

In certain embodiments, the action to be performed additionally or alternatively includes enabling the player to transfer funds between different accounts utilizing a mobile device application executed by a mobile device. That is, in addition to establishing an amount of funds in one or more accounts of the system as described herein, the system disclosed enables funds to be transferred between different components within the system. Put differently, after an amount of funds are deposited from a funding source into a maintained account, the system enables such funds to be subsequently transferred to another account or destination within the system.

In these embodiments, following the player's decision to transfer an amount of funds from a first account or balance associated with a first system component to a second account or balance associated with a second system component, the system determines whether to authorize the transfer of the determined amount of funds. If the system determines not to authorize the determined amount of funds, the system communicates a denial of fund transfer to the player. On the other hand, if the system determines to authorize the determined amount of funds, the first system component updates the first account (to reflect a reduction of the determined amount of funds) and communicates an authorization to the second system component. The second system component then increases a balance of available funds of the second account or balance by the transferred amount of funds.

In certain embodiments, the system utilizes a mobile device to facilitate the transfer of funds from a cashless wagering account to a gaming establishment retail account. In these embodiments, the transfer of funds from the cashless wagering account to the gaming establishment retail account occurs via one or more applications being run or executed on the mobile device. That is, in addition to the other actions disclosed herein (e.g., utilizing the mobile device application to facilitate the transfer of funds from the cashless wagering account to the EGM), to be performed which may be selected via the mobile device application, the mobile device application enables the player to request that an amount of funds be transferred from the cashless wagering account to the gaming establishment retail account.

It should be appreciated that in various embodiments the system limits the transfer of funds from a cashless wagering account to a gaming establishment retail account to funds that can be redeemed for cash, such as funds and/or non-restricted promotional credits. That is, to prevent a player from improperly converting non-cashable funds held in a cashless wagering account to products and/or services, the system enables the player to utilize funds (i.e., credits that can be directly converted to cash) to load funds from their cashless wagering account to their gaming establishment retail account (which are then usable for goods and/or services, but not otherwise redeemable for cash). In certain embodiments, this configuration provides just-in-time funding of the gaming establishment retail account to enable the player to make purchases at different point-of-sale locations associated with the gaming establishment retail network.

Following the player's decision to transfer an amount of funds (in the form of funds) from a cashless wagering account to a gaming establishment retail account, the cashless wagering system determines whether to authorize the transfer of the determined amount of funds. If the cashless wagering system determines not to authorize the determined amount of funds, the cashless wagering system communicates a denial to the mobile device application, wherein the mobile device application displays a denial of fund transfer to the player.

On the other hand, if the cashless wagering system determines to authorize the determined amount of funds, the cashless wagering system updates the cashless wagering account associated with the player (to reflect a reduction of the determined amount of funds) and communicates an authorization to the gaming establishment retail system. The gaming establishment retail system then increases a balance of available funds of the gaming establishment retail account by the transferred amount of funds. The mobile device application proceeds with displaying an updated gaming establishment retail account balance as well as an updated cashless wagering account balance.

In certain embodiments, the system includes an automatic reload feature wherein if a gaming establishment retail account falls below a threshold level, the system automatically transfers an amount from the external account, the cashless wagering account and/or the gaming establishment account to the gaming establishment retail account. It should be appreciated that, in certain embodiments, the system enables the player to enable or disable such an automatic reload feature.

In certain embodiments, the system utilizes a mobile device to facilitate the transfer of funds from a gaming establishment retail account to a cashless wagering account. In these embodiments, the transfer of funds from a gaming establishment retail account to a cashless wagering account occurs utilizing one or more inputs received via the mobile device application and one or more inputs received via the EGM.

In various embodiments, the mobile device application utilized to transfer funds between a gaming establishment retail account and a cashless wagering account is associated with the gaming establishment retail account and the cashless wagering account, such that the player may view the balances of at least these accounts via the mobile device application.

In various embodiments, the mobile device application enables the player to request that an amount of funds be transferred from the gaming establishment retail account to the cashless wagering account. It should be appreciated that since the balance of funds in the gaming establishment retail account cannot be converted to cash, the system transfers any funds from the gaming establishment retail account to the cashless wagering account as non-cashable fund. As described herein, such non-cashable funds may be subsequently transferred to the EGM (and usable to play one or more wagering games on the EGM), but such non-cashable funds may not be otherwise directly redeemable for cash (however any winnings from any games played funded by such non-cashable funds are redeemable for cash). In certain scenarios, the conversion of an amount of non-cashable funds from a gaming establishment retail account to an amount of non-cashable funds of a cashless wagering account is effectively providing that an amount of non-cashable funds from a gaming establishment retail account is being used to purchase a quantity of pre-paid plays. In different embodiments, these pre-paid plays are of one or more wagering games of an EGM, one or more placements of one or more sports wagers on one or more sporting events, one or more wagering games of a mobile device and/or one or more table games occurring at a gaming table. It should thus be appreciated that while described herein predominantly as a player placing wagers at an EGM, the present disclosure also applies to wagers placed by the player at a gaming table, such as an electronic gaming table, wagers placed by a player at a gaming terminal associated with one or more gaming tables, wagers placed by a player on a mobile device, wagers placed by a player on one or more sporting events, and/or any applicable wagers placed via any applicable wagering device associated with the system.

Following the player's decision to transfer an amount of funds from a gaming establishment retail account to a cashless wagering account, the gaming establishment retail system determines whether to authorize the transfer of the determined amount of funds. If the gaming establishment retail system determines not to authorize the determined amount of funds, the gaming establishment retail system communicates a denial to the mobile device application, wherein the mobile device application display a denial of funds transfer to the player.

On the other hand, if the gaming establishment retail system determines to authorize the determined amount of funds, the gaming establishment retail system updates the gaming establishment retail account associated with the player (to reflect a reduction of the determined amount of funds) and communicates an authorization to the cashless wagering system. The cashless wagering system increases a balance of funds of the cashless wagering account by the transferred amount of funds. The mobile device application proceeds with displaying an updated gaming establishment retail account balance as well as an updated cashless wagering account balance.

Accordingly, the utilization of a mobile device to facilitate the transfer of funds from one gaming establishment account to another gaming establishment account provides a player an otherwise uninterrupted gaming experience and thus increases the player's satisfaction with their time spent at the gaming establishment. For example, rather than having to carry cash and/or ticket vouchers (which may be lost or stolen and which are associated with various costs to a gaming establishment) between the gaming establishment's retail space and the gaming establishment's gaming space, the system enables a player to simply carry their mobile device which has access to funds to be used in both the gaming establishment's retail space and the gaming establishment's gaming space. In another example, since certain regulations provide that funds which reside in a cashless wagering account are frozen if wagers are not placed using that cashless wagering account within a sixteen month period, the utilization of a gaming establishment retail account (which do not have the same time-based restrictions) to hold the funds coupled with the seamless, mobile facilitated transfer of such funds from the gaming establishment retail account to the cashless wagering account overcomes certain player's concerns of having their funds frozen due to inactivity.

Moreover, the utilization of a mobile device to transfer funds to the EGM reduces the costs associated with utilizing cash, ticket vouchers and/or promotional tickets. For example, the utilization of cash and ticket vouchers is associated with the labor costs of having to periodically remove a cash box including received ticket vouchers and cash from the EGM, replace the removed cash box with an empty one and refill the blank ticket voucher stacks housed by the EGM. The utilization of such cash and ticket vouchers is further associated with the various labor costs of counting the cash and ticket vouchers removed from the EGM. Specifically, any removed cash is transported to a secure area where one or more individuals are involved in counting and recording the various sums of cash and/or ticket vouchers removed from each EGM. The cash amounts removed from each EGM are reconciled with other information sources, such as from hard meters on the EGM or records from a server that generates and validates ticket vouchers. The reconciliation process ensures the earnings from the EGM are properly taxed. Additionally, the utilization of promotional tickets is associated with the various costs of printing such promotional tickets, mailing such promotional tickets to players prior to such players visiting the gaming establishment and/or staffing a player service desk with personal to redeem such promotional tickets. The utilization of a wirelessly connected mobile device to facilitate one or more requested actions as described herein reduces or eliminates these various costs associated with utilizing cash, ticket vouchers and/or promotional tickets.

Mobile Device/EGM Communications

In various embodiments, as indicated above, prior to utilizing a mobile device to take one or more actions, such as accessing funds maintained in one or more of the gaming establishment accounts associated with a player or user, a pairing or linkage occurs between the mobile device and the gaming establishment device. The pairing or linkage between the mobile device and the gaming establishment device occurs via one or more applications being run or executed on the mobile device. It should be appreciated that while described herein as linking a mobile device to an EGM, such linking may additionally or alternatively occur between the mobile device and any suitable gaming establishment device located in a gaming establishment, such as an electronic gaming table, a gaming terminal associated with one or more gaming tables, or a kiosk which receives wagers such as wagers on sporting events and/or any suitable gaming establishment device located in a non-gaming area of a gaming establishment, such as a point-of-sale terminal located in a retail area of a gaming establishment.

In various embodiments, the insertion and removal of an electronic player tracking card (i.e., the logging in and logging out of the player from the player tracking system), and/or the facilitation of the transfer of funds between a gaming establishment account maintained for a player and an EGM is accomplished by one or more wireless communication protocols between the EGM and the mobile device. In such embodiments, the EGM of the present disclosure includes one or more mobile device interfaces for communicating with a mobile device utilizing one or more wireless communication protocols including, but not limited to: Bluetooth™, Bluetooth™ Low Energy ("BLE"), one or more cellular communication standards (e.g., 3G, 4G, LTE), one or more Wi-Fi compatible standards, and one or more short range communication protocols (e.g., a near field communication ("NFC") protocol).

In certain embodiments, the communication with the mobile device can occur through one or more wireless interfaces of the EGM. Such wireless interfaces are configured to receive information, such as information associated with one or more accounts and instructions to initiate a transfer of funds to and from a gaming establishment account and the EGM utilizing a mobile device.

In one embodiment, the wireless interface is integrated into the cabinet of the EGM and the EGM processor is configured to communicate directly with and send control commands to the wireless interface. In another embodiment, the wireless interface is integrated into a device mounted to and/or within the EGM cabinet, such as a player tracking unit or a player identification device of a player tracking unit. In certain embodiments where the wireless interface is embedded in a secondary device, such as a player tracking unit, the EGM processor sends control commands to control the wireless interface via a secondary controller, such as a player tracking controller.

In certain embodiments disclosed herein, the wireless interface implements an NFC protocol to facilitate the insertion and removal of an electronic player tracking card (i.e., the logging in and logging out of the player from the player tracking system) and/or the transfer of funds between a gaming establishment account maintained for a player and an EGM. In certain embodiments which utilize the NFC implementation, the mobile device application registers a mobile device application with one or more processors of the mobile device. In these embodiments, when the mobile device is detected by an NFC reader of a component of a gaming establishment management system supported by the EGM cabinet, such as a NexGen® player tracking component of an IGT Advantage® system, the component of the gaming establishment management system supported by the EGM cabinet communicates one or more data messages to the mobile device (or to one or more servers which then communicate such data messages to the mobile device). Such data messages are commands generated by the component of the gaming establishment management system supported by the EGM cabinet when the mobile device is detected in the NFC reader field. The processor of the mobile device communicates the data message to the mobile device application. The mobile device application responds, such as communicating a triggering message, and a communication channel is opened between the component of the gaming establishment management system supported by the EGM cabinet and the mobile device application (or between the component of the gaming establishment management system supported by the EGM cabinet, one or more servers and the mobile device application). This open communication channel enables the component of the gaming establishment management system supported by the EGM cabinet to send, though the NFC reader, additional data messages to the mobile device (or to the mobile device via one or more servers) which are responded to by the mobile device application of the mobile device.

It should be appreciated that as long as the mobile device remains within the NFC field, the component of the gaming establishment management system supported by the EGM cabinet is configured to communicate with the mobile device and send data, such as status updates, as necessary. However, once the mobile device is removed from the NFC field, the communication channel is closed and such status updates must be discontinued.

In other embodiments, the wireless interface implements a Wi-Fi, cellular and/or Bluetooth™ communications protocol to facilitate the insertion and removal of an electronic player tracking card (i.e., the logging in and logging out of the player from the player tracking system) and/or the transfer of funds between a gaming establishment account maintained for a player and an EGM. In such embodiments, Bluetooth™ pairing occurs when two Bluetooth devices agree to communicate with each other and establish a connection. In order to pair two Bluetooth wireless devices, a password (passkey) is exchanged between the two devices. The Passkey is a code shared by both Bluetooth devices, which proves that both users have agreed to pair with each other. After the passkey code is exchanged, an encrypted communication can be set up between the pair devices. In Wi-Fi paring, every pairing can be set up with WPA2 encryption or another type of encryption scheme to keep the transfer private. Wi-Fi Direct is an example of a protocol that can be used to establish point-to-point communications between two Wi-Fi devices. The protocol enables for a Wi-Fi device pair directly with another without having to first join a local network.

It should be appreciated that Wi-Fi, cellular or Bluetooth™ communication protocols can be used in lieu of or in combination with NFC. For instance, an NFC communication can be used to instantiate a Wi-Fi or Bluetooth™ communication between the EGM, zero, one or more servers and a mobile device, such as secure pairing using one of these protocols. That is, in one embodiment, an NFC interface on an EGM can be used to set-up a higher speed communication between the EGM, zero, one or more servers and the NFC enabled mobile device. The higher speed communication rates can be used for expanded content sharing. For instance, a NFC and Bluetooth enabled EGM can be tapped by an NFC and Bluetooth enabled mobile device for instant Bluetooth pairing between the devices and zero, one or more servers. Instant Bluetooth pairing between an EGM, an NFC enabled mobile device and zero, one or more servers, can save searching, waiting, and entering codes. In another example, an EGM can be configured as an NFC enabled router, such as a router supporting a Wi-Fi communication standard. Tapping an NFC enabled mobile device to an NFC enabled and Wi-Fi enabled EGM can be used to establish a Wi-Fi connection between the devices and zero, one or more servers.

In certain embodiments which implement a Wi-Fi, cellular and/or Bluetooth™ communications protocol, the gaming system utilizes one or more QR codes generated by the EGM to facilitate the communication of data between the mobile device and the gaming system. In such embodiments, the QR code is used to identify the EGM that is displaying the QR code to identify the server to which the mobile device should connect. It should be appreciated that the QR code enables the gaming system to establish a secure tunnel or path from the mobile device to the gaming establishment's Wi-Fi network and then to the gaming establishment's wired network and finally to the EGM. In these embodiments, a communication tunnel wrapper (i.e., a Wi-Fi/Bluetooth™ tunnel wrapper) is utilized to establish a connection between the gaming system and the mobile device and to transport any data messages described herein between the EGM, zero, one or more servers and the mobile device.

More specifically, in certain embodiments, the player requests, via an input at the EGM and/or the mobile device, the generation of a QR code by the EGM. In response to the player's request, the EGM or a player tracking unit displays a QR code. In certain embodiments, the QR code includes a nonce which prevents a third-party (e.g., another player) from sniping the player's login attempt. Such an on-demand QR code remains valid for a designated amount of time such that if the player does not scan the QR code within the designated amount of time, another QR code is necessary to be scanned to connect the mobile device to the EGM.

In these embodiments, following the prompting to cause the EGM or player tracking unit to display a QR code and the instructions with how to proceed to Card In via scanning the displayed QR code with the mobile device, the player scans the QR code with the mobile device application. If the gaming system determines that the QR code is valid (i.e., not expired), the mobile device application will connect to the gaming system. It should be appreciated that as long as the established connection between the mobile device and the gaming system remains active, one or more gaming system servers and mobile device may communicate data, such as status updates, as necessary. It should be further appreciated that in association with the Wi-Fi or Bluetooth™ or mobile device network communications protocol described herein, any action requested by the player via the mobile device application does not require a new engagement between the mobile device and the EGM, such as a new scanning of the QR code to send such a requested action from the mobile device to the EGM (or to send a requested action from the mobile device to one or more servers and then from one or more servers to the EGM).

In certain embodiments, following the scanning of a valid QR code, the mobile device application connects to one or more servers. Such servers use websockets secured with a transport layer security protocol or other similar mechanisms. In one such embodiment, the servers operate with one or more translators and zero, one or more components of the gaming system, similarly using websockets secured with a transport layer security protocol, to communicate data to the EGM or a component of the EGM. It should be appreciated that in certain embodiments, one or more of the servers are scalable servers configured to scale to accept connections from thousands of mobile devices.

In certain embodiments, after establishing a connection with one or more servers, the mobile device application transmits a connect command to the gaming system. In response to receiving a connect command from the mobile device, the gaming system sends a message to the mobile device. This message serves to encapsulate various commands between the gaming system and the mobile device. In these embodiments, if the mobile device application does not receive this message within a designated period of time, such as within five seconds, the mobile device application displays an error message to the player and directs the player to rescan the QR code.

In addition to the connect command communicated from the mobile device application to the gaming system, the mobile device application of these embodiments is configured to send a disconnect command to the gaming system. Such a disconnect command functions to tear-down the connection the server. That is, after the server receives the disconnect command from the mobile device application, the server sends this disconnect command to the translator and close the websocket to the mobile device application. In these embodiments, if the websocket is not closed or otherwise terminated within a designated period of time, such as five seconds, the mobile device application may retry communicating this command or close the websocket. It should be appreciated that if the mobile device connection is severed before this command is received by the gaming system, the sever sends this command on behalf of the mobile device application;

In another embodiment, the mobile device application is configured to send a trigger command to the gaming system, such as a component of the gaming establishment management system supported by the EGM cabinet. In this embodiment, the trigger command is associated with an action requested by the player, such as a transfer of funds to or from the EGM. In such embodiments, when the gaming system receives the trigger command from the mobile device application, the gaming system will communicate the appropriate requests to the mobile device application. If the mobile device application does not receive these requests within a designated amount of time, such as five seconds, the mobile device application will display an error message to the player and enable the player to retry the requested action.

In other embodiments, the mobile device application communicates with the gaming system through a tunnel established over the mobile device's Wi-FI network or the mobile device's network connection. In such embodiments, the mobile device application will connect to one or more gaming system servers which use websockets secured with a transport layer security protocol. The gaming system server operates with one or more translators, similarly using websockets secured with a transport layer security protocol to communicate data to the EGM or a component of the EGM.

In certain embodiments which utilize the NFC communication protocol described herein, which utilize the Wi-Fi, cellular and/or Bluetooth™ communication protocols described herein and/or which utilize any other communication protocol described herein, any action requested by the player via the mobile device application requires a new engagement between the mobile device and the EGM, such as a new tap of the mobile device to a card reader or other designated location(s) of the EGM. In certain other embodiments which utilize the NFC communication protocol described herein, which utilize the Wi-Fi, cellular and/or Bluetooth™ communication protocols described herein and/ or which utilize any other communication protocol described herein, certain actions requested by the player via the mobile device application requires a new engagement between the mobile device and the EGM, such as a new tap of the mobile device to a card reader or other designated location(s) of the EGM and other actions requested by the player via the mobile device application do not require any new engagement between the mobile device and the EGM.

Gaming Systems

The above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices. Moreover, an EGM as used herein refers to any suitable electronic gaming machine which enables a player to play a game (including but not limited to a game of chance, a game of skill, and/or a game of partial skill) to potentially win one or more awards, wherein the EGM comprises, but is not limited to: a slot machine, a video poker machine, a video lottery terminal, a terminal associated with an electronic table game, a video keno machine, a video bingo machine located on a casino floor, a sports betting terminal, or a kiosk, such as a sports betting kiosk.

In various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts.

As noted above, in various embodiments, the gaming system includes an EGM (or personal gaming device) in combination with a central server, central controller, or remote host. In such embodiments, the EGM (or personal gaming device) is configured to communicate with the central server, central controller, or remote host through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a central server, central controller, or remote host through a data network.

In certain embodiments in which the gaming system includes an EGM (or personal gaming device) in combination with a central server, central controller, or remote host, the central server, central controller, or remote host is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the central server, central controller, or remote host. The at least one processor of that EGM (or personal gaming device) is configured to execute the events, messages, or commands represented by such data or signals in conjunction with the operation of the EGM (or personal gaming device). Moreover, the at least one processor of the central server, central controller, or remote host is configured to transmit and receive data or signals representing events, messages, commands, or any other suitable information between the central server, central controller, or remote host and the EGM (or personal gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device). Further, one, more than one, or each of the functions of the at least one processor of the EGM (or personal gaming device) may be performed by the at least one processor of the central server, central controller, or remote host.

In certain such embodiments, computerized instructions for controlling any games (such as any primary or base games and/or any secondary or bonus games) displayed by the EGM (or personal gaming device) are executed by the central server, central controller, or remote host. In such "thin client" embodiments, the central server, central controller, or remote host remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the central server, central controller, or remote host to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a central server, central controller, or remote host, computerized instructions for controlling any primary or base games displayed by the EGM (or personal gaming device) are communicated from the central server, central controller, or remote host to the EGM (or personal gaming device) in a thick client configuration, and computerized instructions for controlling any secondary or bonus games or other functions displayed by the EGM (or personal gaming device) are executed by the central server, central controller, or remote host in a thin client configuration.

In certain embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is a local area network (LAN) in which the EGMs (or personal gaming devices) are located substantially proximate to one another and/or the central server, central controller, or remote host. In one example, the EGMs (or personal gaming devices) and the central server, central controller, or remote host are located in a gaming establishment or a portion of a gaming establishment.

In other embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is a wide area network (WAN) in which one or more of the EGMs (or personal gaming devices) are not necessarily located substantially proximate to another one of the EGMs (or personal gaming devices) and/or the central server, central controller, or remote host. For example, one or more of the EGMs (or personal gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices) are located. In certain embodiments in which the data network is a WAN, the gaming system includes a central server, central controller, or remote host and an EGM (or personal gaming device) each located in a different gaming establishment in a same geographic area, such as a same city or a same state. Gaming systems in which the data network is a WAN are substantially identical to gaming systems in which the data network is a LAN, though the quantity of EGMs (or personal gaming devices) in such gaming systems may vary relative to one another.

In further embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique player name and password combination assigned to the player. The central server, central controller, or remote host may, however, identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM (or personal gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal gaming device). Examples of implementations of Internet-based gaming are further described in U.S. Pat. No. 8,764,566, entitled "Internet Remote Game Server," and U.S. Pat. No. 8,147,334, entitled "Universal Game Server".

The central server, central controller, or remote host and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 3:
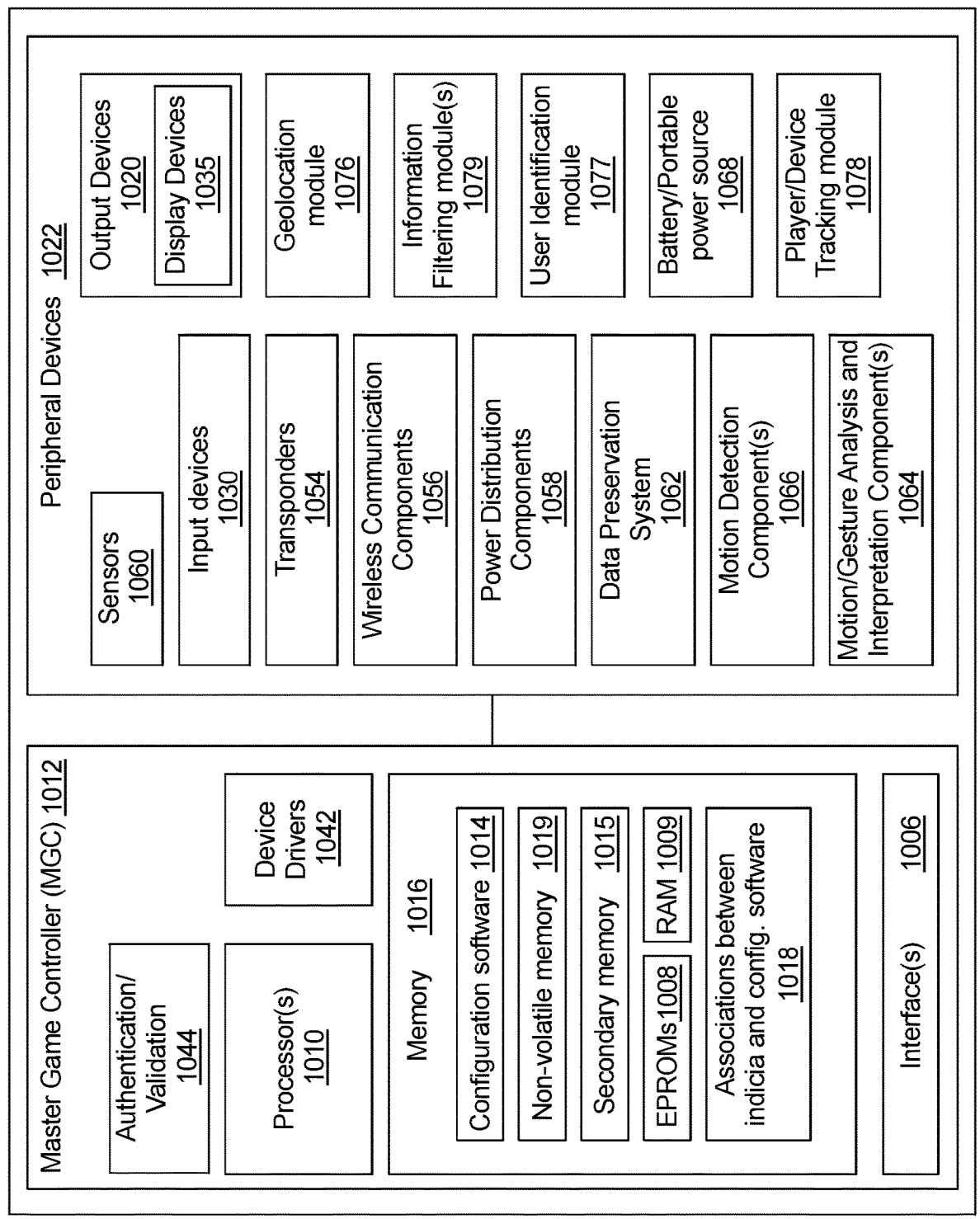
FIG. 3 is a schematic block diagram of one embodiment of an electronic configuration of an example gaming system disclosed herein.
Figure 4A:
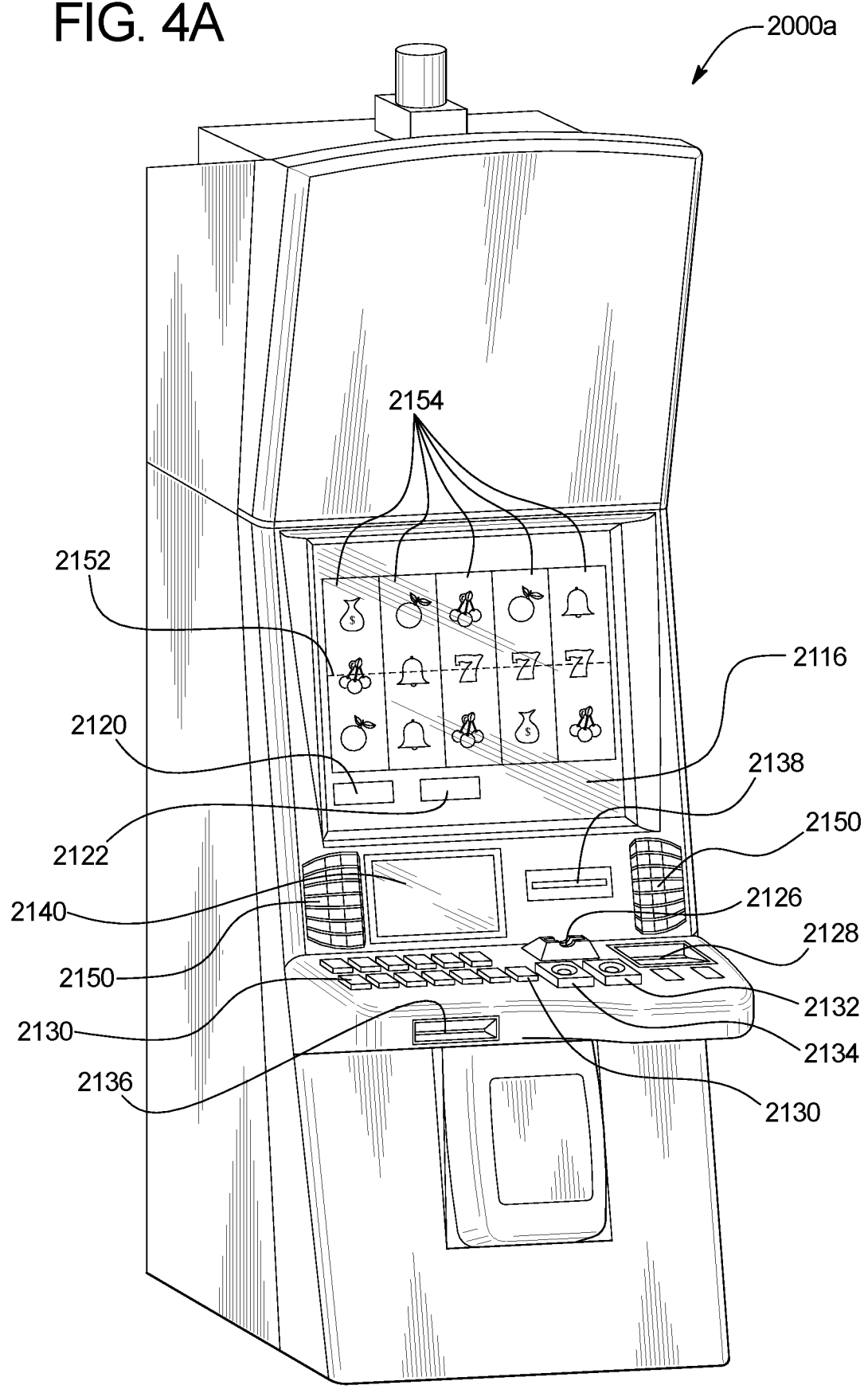
FIGS. 4A and 4B are perspective views of example alternative embodiments of the gaming system disclosed herein.
Figure 4B:
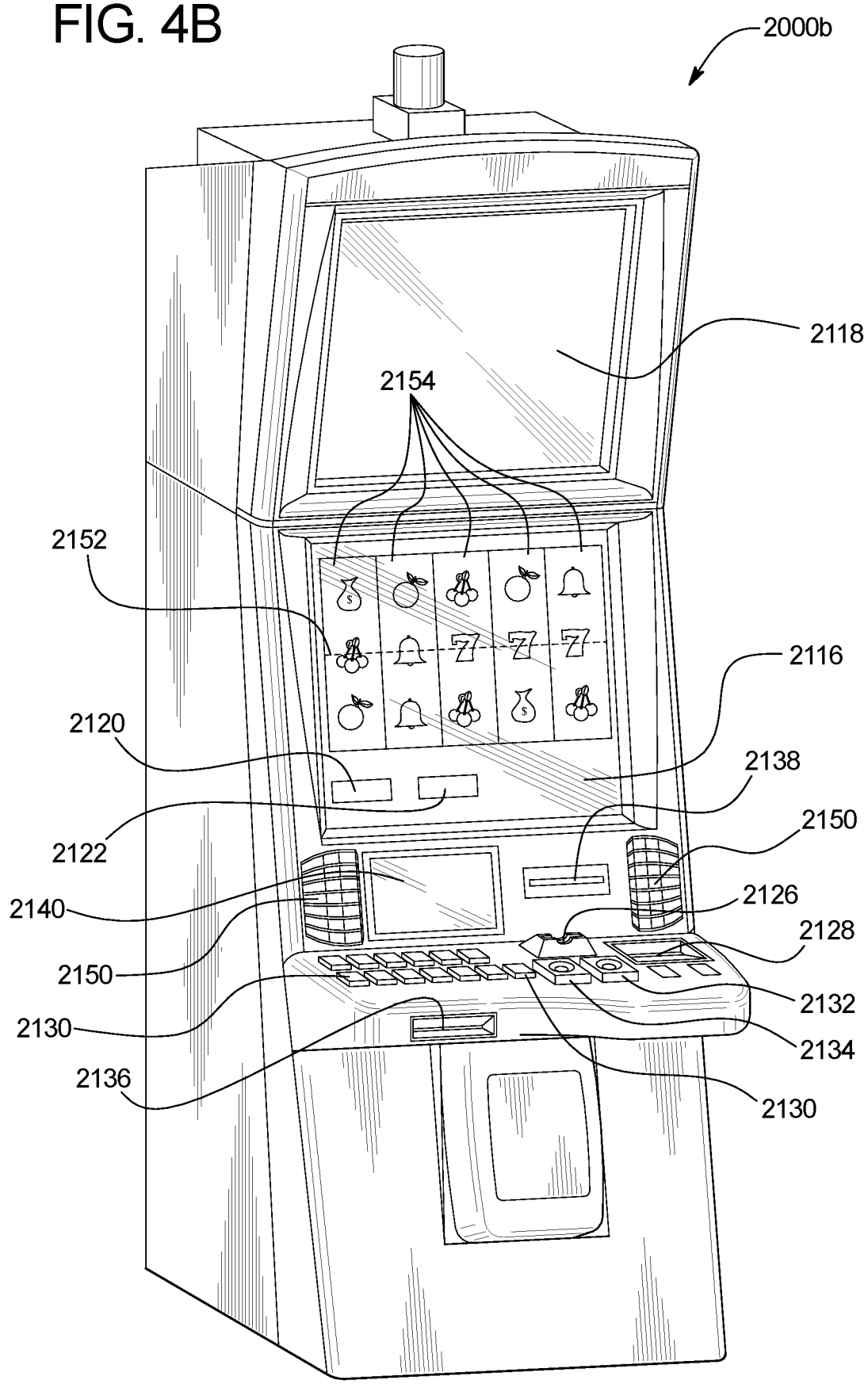
Figure 4C:
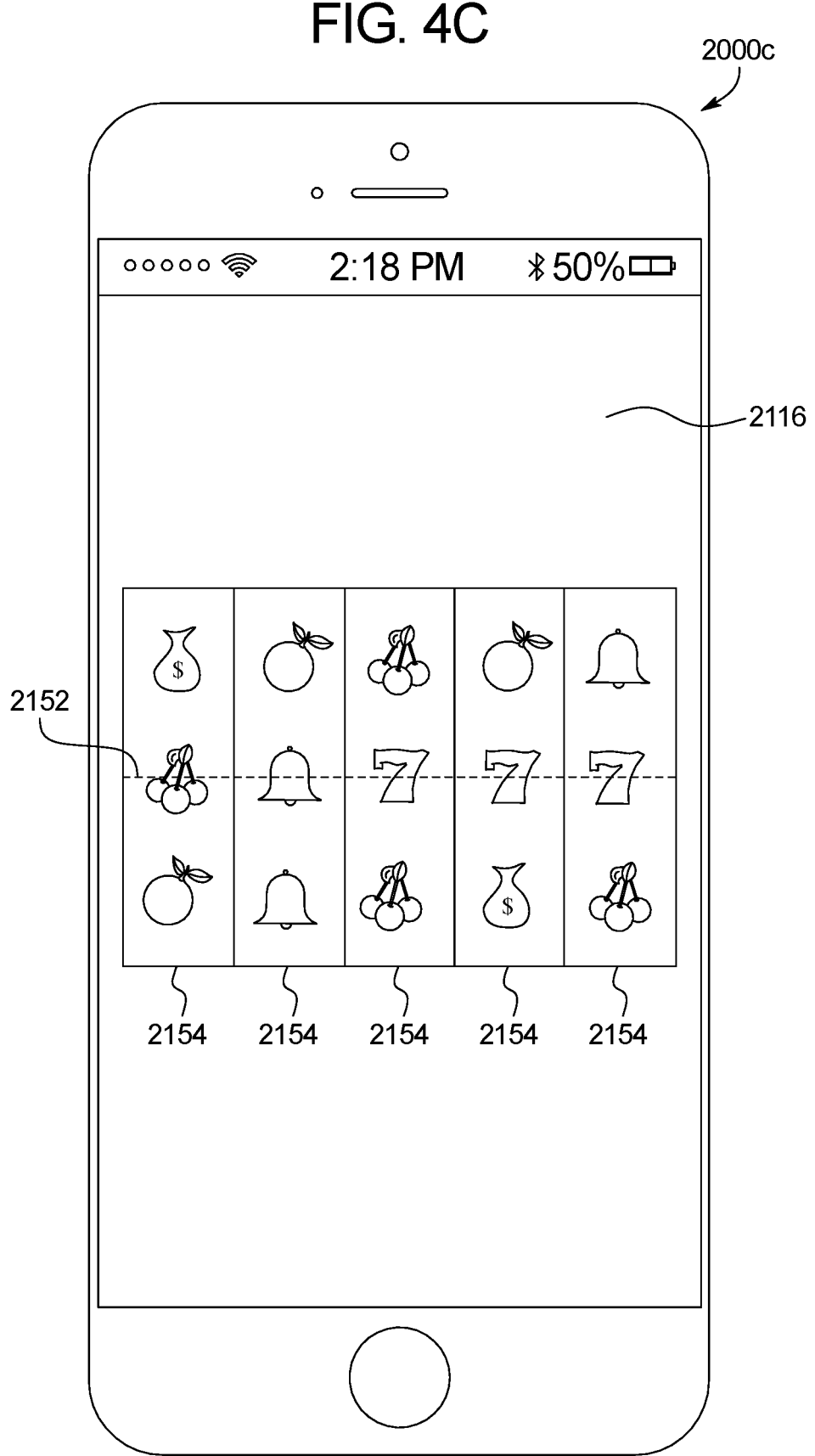
FIG. 4C is a front view of an example personal gaming device of the gaming system disclosed herein.

FIG. 3 is a block diagram of an example EGM 1000 and FIGS. 4A and 4B include two different example EGMs 2000a and 2000b. The EGMs 1000, 2000a, and 2000b are merely example EGMs, and different EGMs may be implemented using different combinations of the components shown in the EGMs 1000, 2000a, and 2000b. Although the below refers to EGMs, in various embodiments personal gaming devices (such as personal gaming device 2000c of FIG. 4C) may include some or all of the below components.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM disclosed herein. In certain embodiments, the at least one memory device 1016 resides within the housing of the EGM (described below), while in other embodiments at least one component of the at least one memory device 1016 resides outside of the housing of the EGM. In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Further-more, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the player's computer, partly on the player's computer, as a stand-alone software package, partly on the player's computer and partly on a remote computer or entirely on the remote computer or server. In the latter scenario, the remote computer may be connected to the player's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, player input device components, information received from one or more player input devices, information stored in the at least one memory device 1016, etc. Examples of various authentication and/or validation components are described in U.S. Pat. No. 6,620,047, entitled "Electronic Gaming Apparatus Having Authentication Data Sets".

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one player identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 2000a illustrated in FIG. 4A includes a central display device 2116, a player tracking display 2140, a credit display 2120, and a bet display 2122. The example EGM 2000b illustrated in FIG. 4B includes a central display device 2116, an upper display device 2118, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000*a* and 2000*b* illustrated in FIGS. 4A and 4B each include a ticket printer and dispenser 2136. Examples of ticket-in ticket-out (TITO) technology are described in U.S. Pat. No. 5,429,361, entitled "Gaming Machine Information, Communication and Display System"; U.S. Pat. No. 5,470,079, entitled "Gaming Machine Accounting and Monitoring System"; U.S. Pat. No. 5,265,874, entitled "Cashless Gaming Apparatus and Method"; U.S. Pat. No. 6,729,957, entitled "Gaming Method and Host Computer with Ticket-In/Ticket-Out Capability"; U.S. Pat. No. 6,729,958, entitled "Gaming System with Ticket-In/Ticket-Out Capability"; U.S. Pat. No. 6,736,725, entitled "Gaming Method and Host Computer with Ticket-In/Ticket-Out Capability"; U.S. Pat. No. 7,275,991, entitled "Slot Machine with Ticket-In/Ticket-Out Capability"; and U.S. Pat. No. 6,048,269, entitled "Coinless Slot Machine System and Method".

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player. Examples of providing payment using virtual tickets are described in U.S. Pat. No. 8,613,659, entitled "Virtual Ticket-In and Ticket-Out on a Gaming Machine".

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000*a* and 2000*b* illustrated in FIGS. 4A and 4B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000*a* and 2000*b* illustrated in FIGS. 4A and 4B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. Examples of funding an EGM via communication between the EGM and a mobile device (such as a mobile phone) of a player are described in U.S. Patent Application Publication No. 2013/0344942, entitled "Avatar as Security Measure for Mobile Device Use with Electronic Gaming Machine". When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000*a* and 2000*b* illustrated in FIGS. 4A and 4B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs 2000*a* and 2000*b* illustrated in FIGS. 4A and 4B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 4A and 4B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs 2000*a* and 2000*b* illustrated in FIGS. 4A and 4B each include a card reader 2138. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more player input devices near the EGM. In one embodiment, a player input device docking region is provided, and includes a power distribution component that is configured to recharge a player input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., player input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one player identification module 1077 is configured to determine the identity of the current player or current owner of the EGM. For example, in one embodiment, the current player is required to perform a login process at the EGM in order to access one or more features. Alternatively, the EGM is configured to automatically determine the identity of the current player based on one or more external signals, such as an RFID tag or badge worn by the current player and that provides a wireless signal to the EGM that is used to determine the identity of the current player. In at least one embodiment, various security features are incorporated into the EGM to prevent unauthorized players from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. U.S. Pat. No. 7,290,072 describes a variety of EGMs including one or more communication ports that enable the EGMs to communicate and operate with one or more external peripherals.

As generally described above, in certain embodiments, such as the example EGMs 2000a and 2000b illustrated in FIGS. 4A and 4B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000a and 2000b shown in FIGS. 4A and 4B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

Operation of Primary or Base Games and/or Secondary or Bonus Games

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM before delivery to a gaming establishment or before being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome)

and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. Examples of this type of award evaluation are described in U.S. Pat. No. 7,470,183, entitled "Finite Pool Gaming Method and Apparatus"; U.S. Pat. No. 7,563,163, entitled "Gaming Device Including Outcome Pools for Providing Game Outcomes"; U.S. Pat. No. 7,833,092, entitled "Method and System for Compensating for Player Choice in a Game of Chance"; U.S. Pat. No. 8,070,579, entitled "Bingo System with Downloadable Common Patterns"; and U.S. Pat. No. 8,398,472, entitled "Central Determination Poker Game".

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. Examples of this type of award determination are described in U.S. Pat. No. 7,753,774, entitled "Using Multiple Bingo Cards to Represent Multiple Slot Paylines and Other Class III Game Options"; U.S. Pat. No. 7,731,581, entitled "Multi-Player Bingo Game with Multiple Alternative Outcome Displays"; U.S. Pat. No. 7,955,170, entitled "Providing Non-Bingo Outcomes for a Bingo Game"; U.S. Pat. No. 8,070,579, entitled "Bingo System with Downloadable Common Patterns"; and U.S. Pat. No. 8,500,538, entitled "Bingo Gaming System and Method for Providing Multiple Outcomes from Single Bingo Pattern".

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database configured to store player profiles, (b) a player tracking module configured to track players (as described below), and (c) a credit system configured to provide automated transactions. Examples of such accounting systems are described in U.S. Pat. No. 6,913,534, entitled "Gaming Machine Having a Lottery Game and Capability for Integration with Gaming Device Accounting System and Player Tracking System," and U.S. Pat. No. 8,597,116, entitled "Virtual Player Tracking and Related Services".

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGM 2000b shown in FIG. 4B includes a payline 2152 and a plurality of reels 2154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. Examples of ways to win award determinations are described in U.S. Pat. No. 8,012,011, entitled "Gaming Device and Method Having Independent Reels and Multiple Ways of Winning"; U.S. Pat. No. 8,241,104, entitled "Gaming Device and Method Having Designated Rules for Determining Ways To Win"; and U.S. Pat. No. 8,430,739, entitled "Gaming System and Method Having Wager Dependent Different Symbol Evaluations".

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. Examples of progressive gaming systems are described in U.S. Pat. No. 7,585,223, entitled "Server Based Gaming System Having Multiple Progressive Awards"; U.S. Pat. No. 7,651,392, entitled "Gaming Device System Having Partial Progressive Payout"; U.S. Pat. No. 7,666,093, entitled "Gaming Method and Device Involving Progressive Wagers"; U.S. Pat. No. 7,780,523, entitled "Server Based Gaming System Having Multiple Progressive Awards"; and U.S. Pat. No. 8,337,298, entitled "Gaming Device Having Multiple Different Types of Progressive Awards".

As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game (s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. Examples of group gaming systems are described in U.S. Pat. No. 8,070,583, entitled "Server Based Gaming System and Method for Selectively Providing One or More Different Tournaments"; U.S. Pat. No. 8,500,548, entitled "Gaming System and Method for Providing Team Progressive Awards"; and U.S. Pat. No. 8,562,423, entitled "Method and Apparatus for Rewarding Multiple Game Players for a Single Win".

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. Examples of player tracking systems are described in U.S. Pat. No. 6,722,985, entitled "Universal Player Tracking System"; U.S. Pat. No. 6,908,387, entitled "Player Tracking Communication Mechanisms in a Gaming Machine"; U.S. Pat. No. 7,311,605, entitled "Player Tracking Assembly for Complete Patron Tracking for Both Gaming and Non-Gaming Casino Activity"; U.S. Pat. No. 7,611,411, entitled "Player Tracking Instruments Having Multiple Communication Modes"; U.S. Pat. No. 7,617,151, entitled "Alternative Player Tracking Techniques"; and U.S. Pat. No. 8,057,298, entitled "Virtual Player Tracking and Related Services".

Web-Based Gaming

In various embodiments, the gaming system includes one or more servers configured to communicate with a personal gaming device—such as a smartphone, a tablet computer, a desktop computer, or a laptop computer—to enable web-based game play using the personal gaming device. In various embodiments, the player must first access a gaming website via an Internet browser of the personal gaming device or execute an application (commonly called an "app") installed on the personal gaming device before the player can use the personal gaming device to participate in web-based game play. In certain embodiments, the one or more servers and the personal gaming device operate in a thin-client environment. In these embodiments, the personal gaming device receives inputs via one or more input devices (such as a touch screen and/or physical buttons), the personal gaming device sends the received inputs to the one or more servers, the one or more servers make various determinations based on the inputs and determine content to be displayed (such as a randomly determined game outcome and corresponding award), the one or more servers send the content to the personal gaming device, and the personal gaming device displays the content.

In certain such embodiments, the one or more servers must identify the player before enabling game play on the personal gaming device (or, in some embodiments, before enabling monetary wager-based game play on the personal gaming device). In these embodiments, the player must identify herself to the one or more servers, such as by inputting the player's unique playername and password combination, providing an input to a biometric sensor (e.g., a fingerprint sensor, a retinal sensor, a voice sensor, or a facial-recognition sensor), or providing any other suitable information.

Once identified, the one or more servers enable the player to establish an account balance from which the player can draw credits usable to wager on plays of a game. In certain embodiments, the one or more servers enable the player to initiate an electronic funds transfer to transfer funds from a bank account to the player's account balance. In other embodiments, the one or more servers enable the player to make a payment using the player's credit card, debit card, or other suitable device to add money to the player's account balance. In other embodiments, the one or more servers enable the player to add money to the player's account balance via a peer-to-peer type application, such as PayPal or Venmo. The one or more servers also enable the player to cash out the player's account balance (or part of it) in any suitable manner, such as via an electronic funds transfer, by initiating creation of a paper check that is mailed to the player, or by initiating printing of a voucher at a kiosk in a gaming establishment.

In certain embodiments, the one or more servers include a payment server that handles establishing and cashing out players' account balances and a separate game server configured to determine the outcome and any associated award for a play of a game. In these embodiments, the game server is configured to communicate with the personal gaming device and the payment device, and the personal gaming device and the payment device are not configured to directly communicate with one another. In these embodiments, when the game server receives data representing a request to start a play of a game at a desired wager, the game server sends data representing the desired wager to the payment server. The payment server determines whether the player's account balance can cover the desired wager (i.e., includes a monetary balance at least equal to the desired wager).

If the payment server determines that the player's account balance cannot cover the desired wager, the payment server notifies the game server, which then instructs the personal gaming device to display a suitable notification to the player that the player's account balance is too low to place the desired wager. If the payment server determines that the player's account balance can cover the desired wager, the payment server deducts the desired wager from the account balance and notifies the game server. The game server then determines an outcome and any associated award for the play of the game. The game server notifies the payment server of any nonzero award, and the payment server increases the player's account balance by the nonzero award. The game server sends data representing the outcome and any award to the personal gaming device, which displays the outcome and any award.

In certain embodiments, the one or more servers enable web-based game play using a personal gaming device only if the personal gaming device satisfies one or more jurisdictional requirements. In one embodiment, the one or more servers enable web-based game play using the personal gaming device only if the personal gaming device is located within a designated geographic area (such as within certain state or county lines or within the boundaries of a gaming establishment). In this embodiment, the geolocation module of the personal gaming device determines the location of the personal gaming device and sends the location to the one or more servers, which determine whether the personal gaming device is located within the designated geographic area. In various embodiments, the one or more servers enable non-monetary wager-based game play if the personal gaming device is located outside of the designated geographic area.

In various embodiments, the gaming system includes an EGM configured to communicate with a personal gaming device—such as a smartphone, a tablet computer, a desktop computer, or a laptop computer—to enable tethered mobile game play using the personal gaming device. Generally, in these embodiments, the EGM establishes communication with the personal gaming device and enables the player to play games on the EGM remotely via the personal gaming device. In certain embodiments, the gaming system includes a geo-fence system that enables tethered game play within a particular geographic area but not outside of that geographic area. Examples of tethering an EGM to a personal gaming device and geo-fencing are described in U.S. Patent Appl. Pub. No. 2013/0267324, entitled "Remote Gaming Method Allowing Temporary Inactivation Without Terminating Playing Session Due to Game Inactivity".

Social Network Integration

In certain embodiments, the gaming system is configured to communicate with a social network server that hosts or partially hosts a social networking website via a data network (such as the Internet) to integrate a player's gaming experience with the player's social networking account. This enables the gaming system to send certain information to the social network server that the social network server can use to create content (such as text, an image, and/or a video) and post it to the player's wall, newsfeed, or similar area of the social networking website accessible by the player's connections (and in certain cases the public) such that the player's connections can view that information. This also enables the gaming system to receive certain information from the social network server, such as the player's likes or dislikes or the player's list of connections. In certain embodiments, the gaming system enables the player to link the player's player account to the player's social networking account(s). This enables the gaming system to, once it identifies the player and initiates a gaming session (such as via the player logging in to a website (or an application) on the player's personal gaming device or via the player inserting the player's player tracking card into an EGM), link that gaming session to the player's social networking account(s). In other embodiments, the gaming system enables the player to link the player's social networking account(s) to individual gaming sessions when desired by providing the required login information.

For instance, in one embodiment, if a player wins a particular award (e.g., a progressive award or a jackpot award) or an award that exceeds a certain threshold (e.g., an award exceeding $1,000), the gaming system sends information about the award to the social network server to enable the server to create associated content (such as a screenshot of the outcome and associated award) and to post that content to the player's wall (or other suitable area) of the social networking website for the player's connections to see (and to entice them to play). In another embodiment, if a player joins a multiplayer game and there is another seat available, the gaming system sends that information to the social network sever to enable the server to create associated content (such as text indicating a vacancy for that particular game) and to post that content to the player's wall (or other suitable area) of the social networking website for the player's connections to see (and to entice them to fill the vacancy). In another embodiment, if the player consents, the gaming system sends advertisement information or offer information to the social network server to enable the social network server to create associated content (such as text or an image reflecting an advertisement and/or an offer) and to post that content to the player's wall (or other suitable area) of the social networking website for the player's connections to see. In another embodiment, the gaming system enables the player to recommend a game to the player's connections by posting a recommendation to the player's wall (or other suitable area) of the social networking website.

Differentiating Certain Gaming Systems from General Purpose Computing Devices

Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2)

the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code. Examples of EGM code authentication are described in U.S. Pat. No. 6,962,530, entitled "Authentication in a Secure Computerized Gaming System"; U.S. Pat. No. 7,043,641, entitled "Encryption in a Secure Computerized Gaming System"; U.S. Pat. No. 7,201,662, entitled "Method and Apparatus for Software Authentication"; and U.S. Pat. No. 8,627,097, entitled "System and Method Enabling Parallel Processing of Hash Functions Using Authentication Checkpoint Hashes".

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device.

Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just before the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM before, during, and/or after the disputed game to demonstrate whether the player was correct or not in the player's assertion. Examples of a state-based EGM, recovery from malfunctions, and game history are described in U.S. Pat. No. 6,804,763, entitled "High Performance Battery Backed RAM Interface"; U.S. Pat. No. 6,863,608, entitled "Frame Capture of Actual Game Play"; U.S. Pat. No. 7,111,141, entitled "Dynamic NV-RAM"; and U.S. Pat. No. 7,384,339, entitled, "Frame Capture of Actual Game Play".

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives. Examples of trusted memory devices are described in U.S. Pat. No. 6,685,567, entitled "Process Verification".

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected. Examples of trusted memory devices/sources are described in U.S. Pat. No. 7,515,718, entitled "Secured Virtual Network in a Gaming Environment".

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present. Examples of using a mass storage device are described in U.S. Pat. No. 6,149,522, entitled "Method of Authenticating Game Data Sets in an Electronic Casino Gaming System".

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention is claimed as follows:

1. A system comprising:
a processor; and
a memory device that stores a plurality of instructions that, when executed by the processor, cause the processor to:
maintain a first gaming establishment account in association with a user, and
responsive to a gaming establishment account transfer event occurring in association with the first gaming establishment account:
communicate data associated with a request of an amount of funds to be transferred from a second gaming establishment account maintained in association with the user to the first gaming establishment account, wherein the first gaming establishment account is associated with a first financial institution account associated with a first gaming establishment and the second gaming establishment account is associated with a second, different financial institution account associated with a second gaming establishment, and
responsive to an approval of the request of the amount of funds to be transferred from the second gaming establishment account, modify a balance of the first gaming establishment account based on the amount of funds, wherein the modification of the balance of the first gaming establishment account results in each of a modification of a balance of the second gaming establishment account based on the amount of funds transferred to the first gaming establishment account, a modification of a balance of the first financial institution account based on the amount of funds transferred from the second gaming establishment account, and a modification of a balance of the second financial institution account based on the amount of funds transferred to the first gaming establishment account.

2. The system of claim 1, wherein the first gaming establishment is different from the second gaming establishment.

3. The system of claim 1, wherein the modification of the balance of the first financial institution account and the modification of the balance of the second financial institution account each occur prior to the modification of the balance of the first gaming establishment account.

4. The system of claim 1, wherein the modification of the balance of the first financial institution account and the modification of the balance of the second financial institution account each occur after the modification of the balance of the first gaming establishment account.

5. The system of claim 4, wherein the modification of the balance of the first financial institution account comprises a portion of a batch of modifications of the balance of the first financial account.

6. The system of claim 1, wherein the modification of the balance of the first financial institution account and the modification of the balance of the second financial institution account occur at a designated point in time.

7. The system of claim 1, wherein the gaming establishment account transfer event occurs in association with the first gaming establishment account responsive to a determination that the first gaming establishment account lacks an amount of funds to conduct a transaction requested by the user.

8. The system of claim 1, wherein the first gaming establishment account comprises a cashless wagering account.

9. The system of claim 8, wherein when executed by the processor after the modification of the balance of the first gaming establishment account, the instructions cause the processor to transfer the amount of funds to a credit balance of an electronic gaming machine.

10. A system comprising:
a processor; and
a memory device that stores a plurality of instructions that, when executed by the processor, cause the processor to:
responsive to a determination to transfer an amount of funds from a first gaming establishment account maintained in association with a user to a second gaming establishment account maintained in association with the user:
communicate first data to a server of a first gaming establishment fund management system, the communicated first data results in a deduction of the amount of funds from the first gaming establishment account,
communicate second data to a server of a second gaming establishment fund management system, the communicated second data results in an increase of the amount of funds in the first gaming establishment account,
communicate third data to a server of a first financial institution account associated with a first gaming establishment, the communicated third data results in a deduction of the amount of funds from the first financial institution account, and
communicate fourth data to a server of a second, different financial institution account associated with a second gaming establishment, the communicated fourth data results in an increase of the amount of funds in the second, different financial institution account.

11. The system of claim 10, wherein the deduction of the amount of funds from the first financial institution account, and the increase of the amount of funds in the second, different financial institution account each occur prior to the increase of the amount of funds in the first gaming establishment account.

12. A method of operating a system, the method comprising:
maintaining, by a processor, a first gaming establishment account in association with a user, and
responsive to a gaming establishment account transfer event occurring in association with the first gaming establishment account:
communicating data associated with a request of an amount of funds to be transferred from a second gaming establishment account maintained in association with the user to the first gaming establishment account, wherein the first gaming establishment account is associated with a first financial institution account associated with a first gaming establishment and the second gaming establishment account is associated with a second, different financial institution account associated with a second gaming establishment, and responsive to an approval of the request of the amount of funds to be transferred from the second gaming establishment account, modifying, by the processor, a balance of the first gaming establishment account based on the amount of funds, wherein the modification of the balance of the first gaming establishment account results in each of a modification of a balance of the second gaming establishment account based on the amount of funds transferred to the first gaming establishment account, a modification of a balance of the first financial institution account based on the amount of funds transferred from the second gaming establishment account, and a modification of a balance of the second financial institution account based on the amount of funds transferred to the first gaming establishment account.

13. The method of claim 12, wherein the first gaming establishment is different from the second gaming establishment.

14. The method of claim 12, wherein the modification of the balance of the first financial institution account and the modification of the balance of the second financial institution account each occur prior to the modification of the balance of the first gaming establishment account.

15. The method of claim 12, wherein the modification of the balance of the first financial institution account and the modification of the balance of the second financial institution account each occur after the modification of the balance of the first gaming establishment account.

16. The method of claim 15, wherein the modification of the balance of the first financial institution account comprises a portion of a batch of modifications of the balance of the first financial account.

17. The method of claim 12, wherein the modification of the balance of the first financial institution account and the modification of the balance of the second financial institution account occur at a designated point in time.

18. The method of claim 12, wherein the gaming establishment account transfer event occurs in association with the first gaming establishment account responsive to a determination that the first gaming establishment account lacks an amount of funds to conduct a transaction requested by the user.

19. The method of claim 12, wherein the first gaming establishment account comprises a cashless wagering account.

20. The method of claim 19, further comprising, after the modification of the balance of the first gaming establishment account, transferring, by the processor, the amount of funds to a credit balance of an electronic gaming machine.

* * * * *